United States Patent
Tiwary et al.

(10) Patent No.: US 9,674,255 B1
(45) Date of Patent: Jun. 6, 2017

(54) SYSTEMS, DEVICES AND METHODS FOR PRESENTING CONTENT

(71) Applicant: AMAZON TECHNOLOGIES, INC., Reno, NV (US)

(72) Inventors: Shinjan Kumar Tiwary, Sunnyvale, CA (US); Celil Urgan, Santa Clara, CA (US); Sreeram Raju Chakrovorthy, Campbell, CA (US); Jaee Patwardhan, Sunnyvale, CA (US); Joseph Everett Bentley, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 299 days.

(21) Appl. No.: 14/225,848

(22) Filed: Mar. 26, 2014

(51) Int. Cl.
  *G06F 15/16* (2006.01)
  *H04L 29/06* (2006.01)

(52) U.S. Cl.
  CPC .................. *H04L 65/607* (2013.01)

(58) Field of Classification Search
  CPC ...................................................... H04L 65/607
  See application file for complete search history.

(56) References Cited

U.S. PATENT DOCUMENTS

| | | | | |
|---|---|---|---|---|
| 5,657,426 A * | 8/1997 | Waters | ..................... | G10L 15/24 704/270 |
| 8,335,266 B2 * | 12/2012 | Liu | ................... | H04N 21/23406 375/240.01 |
| 8,351,768 B2 * | 1/2013 | Dalal | ....................... | H04N 5/91 386/353 |
| 8,509,254 B2 * | 8/2013 | Nemiroff | .............. | G06F 9/5027 370/412 |
| 8,521,009 B2 * | 8/2013 | Sardera | ................ | G11B 27/005 386/225 |
| 9,411,983 B2 * | 8/2016 | Mangalampalli | ........ | G06F 21/64 |
| 2004/0117500 A1 * | 6/2004 | Lindholm | ............... | G06F 21/10 709/231 |
| 2010/0014666 A1 * | 1/2010 | Park | ..................... | H04N 7/1675 380/210 |
| 2012/0084438 A1 * | 4/2012 | Raleigh | ................ | H04L 41/046 709/224 |
| 2013/0007298 A1 * | 1/2013 | Ramaswamy | ........ | H04L 65/607 709/231 |

(Continued)

*Primary Examiner* — Dustin Nguyen
*Assistant Examiner* — Javier O Guzman
(74) *Attorney, Agent, or Firm* — Lindauer Law, PLLC

(57) ABSTRACT

Media devices may stream a wide variety of content for presentation. Described herein are systems, devices, and methods for improving the presentation of the content. The media device may execute a pipeline architecture comprising a sequential execution of a plurality of threads. The threads may include a decryption thread, a decoding thread, and a rendering thread. The media device may include buffer queues between the threads, which enable continuous content presentation when one or more of the threads fail to communicate with another thread. The media device may pause the presentation of content by suspending the execution of the rendering thread. In one implementation, the media device replaces a stale frame that is displayed after performing a seek function with a black frame. In another example, to maintain content presentation, the media device drops video frames if an audio video lag event occurs.

20 Claims, 13 Drawing Sheets

(56) References Cited

U.S. PATENT DOCUMENTS

| | | | | |
|---|---|---|---|---|
| 2013/0067116 A1* | 3/2013 | Ostergren | ............. | H04L 65/604 709/248 |
| 2013/0272374 A1* | 10/2013 | Eswaran | ............... | H04L 65/602 375/240.02 |
| 2013/0290697 A1* | 10/2013 | Wang | .................. | H04L 63/0428 713/150 |
| 2014/0025837 A1* | 1/2014 | Swenson | ........... | H04L 29/06027 709/231 |
| 2015/0040169 A1* | 2/2015 | Hoffert | ................... | H04L 65/60 725/88 |
| 2015/0134770 A1* | 5/2015 | Heinz, II | ................ | H04L 47/24 709/217 |

* cited by examiner

SYSTEMS, DEVICES AND METHODS FOR PRESENTING CONTENT

BACKGROUND

Media devices may stream a wide variety of content for presentation. The content may include audio, video, or both. The media devices may include televisions, set-top boxes, tablet computers, personal computers, gaming consoles, in-vehicle entertainment systems, portable media players, and so forth. While streaming video, the media devices may present video freezes or audio defects. These problems may result in an undesirable user experience.

Figure 1:
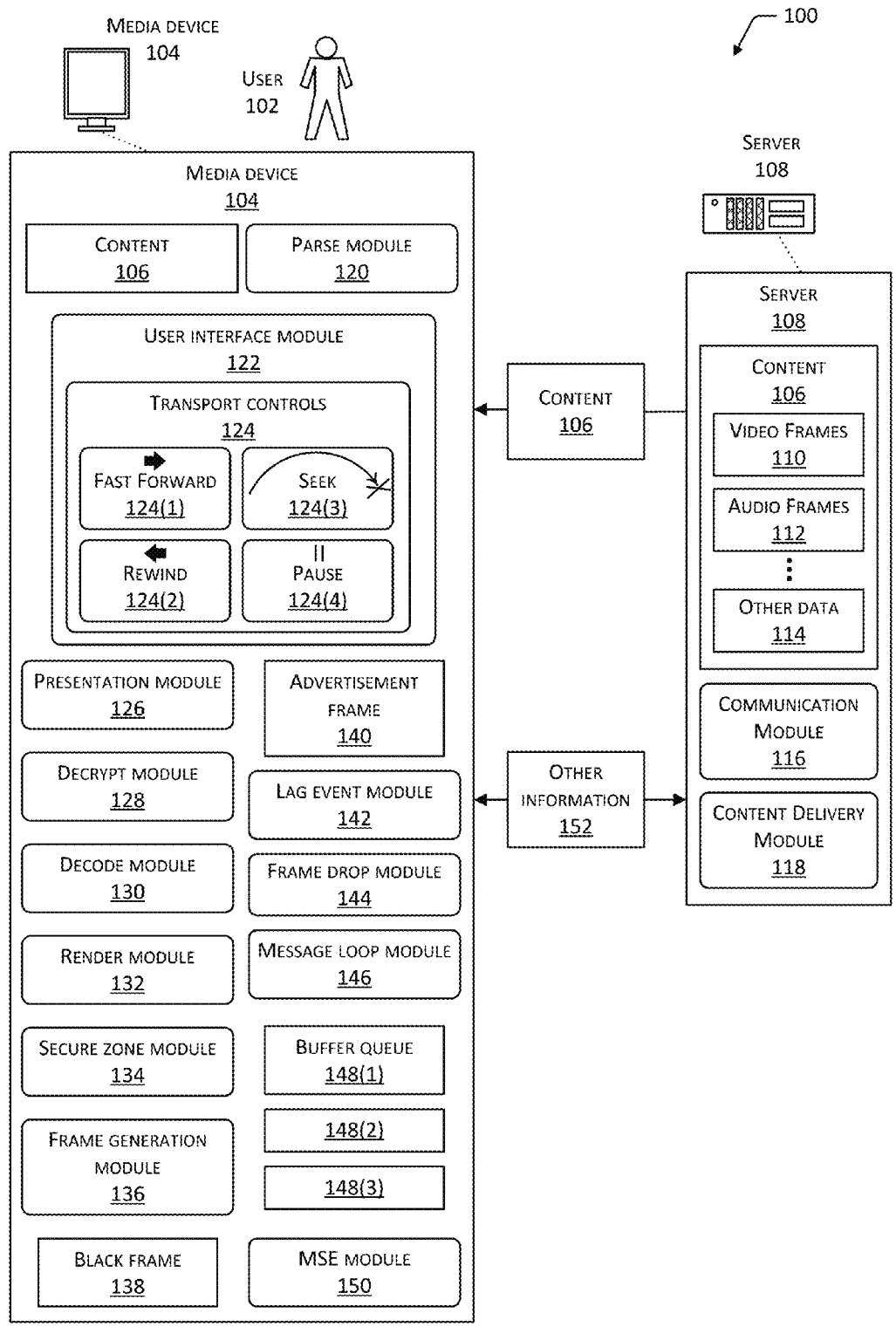
FIG. 1 is an illustrative system configured to improve content presentation.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Media devices may stream content from servers. The content may include audio, video, or both. For example, the content may include television shows, movies, audio books, and so forth. Streaming comprises an incremental ongoing transmission of portions of the content. As portions are received, presentation may take place. Streaming allows for presentation to begin before the entire file has been downloaded. Streaming offers several advantages compared to local storage of the entire file of the content. Local storage requirements of the media device are reduced, lowering costs associated with the device. Content publishers or owners may be better able to determine content consumption statistics such as how many times a movie has been watched. Digital rights management may also be more easily applied and updated, helping to maintain intellectual property rights in the content.

Video content may comprise a plurality of frames. A display output device presents these frames in sequence to produce apparent motion. Frame rates of 15 frames per second or more may be used to provide video. For example, a frame rate of 60 frames per second ("fps") presents 60 frames in sequence for every second, with each frame presented on the display output device for about 1/60 of a second, or about 16.6 milliseconds ("ms").

For presentation of the video content to be maintained without dropouts, stutters, or other presentation anomalies, the frames are delivered to the media device, and ultimately the display output device, without interruption. Various situations may result in dropouts, such as delays in processing, changes in bandwidth, corrupt data resulting in unusable frames, delays in delivery of frames, and so forth.

Described in this disclosure are techniques for improving the presentation of streaming content. The media device may present the content using a browser. The browser may comprise an application used to retrieve information from one or more servers on the web. The browser may support hypertext markup language revision 5 (HTML5) or subsequent which is markup language used for structuring and presenting content for the web. In some implementations, the browser includes a web layout engine. The web layout engine may be configured to display formatted content based on markup content and formatting information.

To perform various functions, the media device may execute one or more threads. A thread may be described as a mini-process running within a main process. In one example, the main process may comprise display content. The mini-processes may include decrypting the content, decoding the content, rendering the content, and so forth.

The media device may include various modules configured to implement the threads. For example, the media device may include a decrypt module configured to decrypt the video frames, a decode module configured to decode the video frames, and a render module configured to render the video frames.

The media device may be configured to execute applications which are native, use a markup language, or a hybrid thereof. Native applications may be written in languages such as C or C++ and are compiled for execution on the particular hardware architecture of the media device. In comparison, a markup language application is executed by a browser. For example, the markup language application may be expressed using HTML5 or subsequent. Compared to native applications, markup language applications are typically easier to deploy across different media devices, may be simpler to maintain, and so forth.

However, interested parties may deem the markup language applications and operating systems they execute on as being too insecure for use. As a result, software developers been driven to develop native applications to present content.

The media device may include hardware and software capable of supporting a secure zone and a non-secure zone without resorting to separate hardware. Thus, the media device may be configurable to execute instructions with the secure zone or the non-secure zone. The secure zone may implement various techniques to prevent malicious access or inadvertent release of sensitive information. For example, the secure zone may have a secured operating system (OS) kernel, set of synchronous libraries, or other mechanism which supports a restricted set of operations which is different from a non-restricted set of non-secure operations. In the implementation where the synchronous library is used, operation of the secure zone may be scheduled and managed using software calls from the non-secure OS. The media device may use the secured OS kernel, dedicated hardware, and other techniques to tightly control access to memory or other devices while operating with the secure zone. For example, the memory may include a bit or register value which allows for designation of a particular memory location as being accessible to the secure zone, the non-secure zone, or both. Continuing the example, the bit or register value may also be used to indicate read/write privileges to that memory location for a particular zone. In another example, access or use of one or more components of the media device may be restricted or permitted. For example, while in the secure zone, a data bus may be unlocked to allow for data transfer to a dedicated portion of the processor which is configured to provide hardware acceleration of encryption. In this disclosure, instructions may include code or sequences of a computer program, or expressed in hardware, which put an operation into effect. Operations may include, but are not limited to, mathematical functions, moving data, or modifying data In comparison, the non-secure zone may execute an operating system which is not deemed secure. For example, the non-secure operating system may be based at least in part on the Android® operating system by Google, Inc. of Mountain View, Calif. Data stored with the non-secure zone may be subject to compromise such as attack, copying, modification, and so forth. To improve security, in some implementations the secure zone may be stateless, as compared to the non-secure zone which may retain state.

The media device may implement the secure zone using architectures or technologies to provide one or more of secure execution, secure memory, or hardware to support secure execution and secure memory. For example, the hardware may comprise dedicated or specialized buses used to transfer information between secure memory locations, devices such as decryption hardware, and so forth.

In one implementation, the media device may be based at least in part on an architecture implementing at least a portion of the ARM® TrustZone® Technology from ARM Holdings PLC of Cambridge, England. For example, the media device may incorporate an ARM Cortex™-A8, Cortex™-A9, Cortex™-A9 MPCore™, and forth. In this implementation, the secure zone corresponds to the "Secure world" of the TrustZone® and the non-secure zone corresponds to the "Normal world" of the TrustZone®.

In other implementations, the architectures may include, but are not limited to those from: MIPS Technologies Inc. of Sunnyvale, Calif.; VideoCore from Broadcom Corp. of Irvine, Calif.; Intel Corp. of Santa Clara, Calif.; Trusted Platform Module (TPM) as codified by ISO/IEC 11889, and so forth. For example, the media device may implement the ARM® TrustZone® as well as any other secure memory firewalling technology, such as that used by VideoCore.

Benefits accrue from performing tasks which do not implicate sensitive data with the non-secure zone while performing tasks involving sensitive data with the secure zone. These benefits include improved security, reduced processing times, and so forth. For example, by minimizing operations with the secure zone, fewer opportunities are provided for malicious or erroneous operation. Furthermore tasks performed with the non-secure zone may execute more quickly, or may benefit from access to additional functionality such as classes, libraries, processor functions, memory functions, and so forth.

Tasks with the non-secure zone may gain additional security benefits when executed as interpreted applications within a virtual machine. For example, the virtual machine may be configured to restrict access to memory or peripherals, shutdown on detection of an error state, and so forth. The interpreted applications may be expressed using a language such as Java® as promulgated by Oracle Corporation of Redwood City, Calif. The interpreted application may be compiled to a bytecode which is then executed by a virtual machine. Continuing the example, the virtual machine may comprise the Dalvik virtual machine as executed in the Android™ OS.

Given the stateless nature of the secure zone in some implementations, setting up for cryptographic operations with the secure zone may involve requesting the same key from a license server each time the encrypted content is accessed for presentation. Each request for the key introduces delay and increases the use of other resources such as electrical power on portable media devices, processor time on the license server, and so forth.

The media device may include a media source extension ("MSE") module configured to allow the markup language applications to use script to generate media streams for presentation. The MSE module may enable the media device to perform functions such as adaptive bitrate streaming ("ABS"). The MSE module is compliant with at least a portion of the Media Source Extensions as promulgated by the World Wide Web Consortium ("W3C").

ABS may be used to mitigate problems associated with changing bandwidth. ABS responds to changes in the bandwidth by transitioning between different versions of the content based on the bandwidth available. Each of these different versions may provide content of different quality. In one implementation, the different versions of the content may include a low quality low bitrate stream, a medium quality medium bitrate stream, and a high quality bitrate stream.

ABS may attempt to estimate future bandwidth, and adjust the quality or resolution of the content delivered to the media device to fit this estimation. Typically these estimations are pessimistic, which may result in unnecessary transitions to lower quality streams of the content. Furthermore, transitions from one quality of content to another may result in stutter or dropout. For example, a transition from video encoded at a high quality (such as a bitrate of 2400 Kbps) to video encoded at a low quality (such as a bitrate of 500 Kbps) may result in a momentary interruption of the video presented to the user by the media device as frames associated with the low quality are stored in the buffer queue.

The media device may synchronize the audio frames and the video frames. Synchronization relates to the relative timing of the presentation of audio and video. When the audio and video are not synchronized, the presentation may annoy the user and cause the user to not enjoy the presentation of the content. Audio may be synchronized with video if the audio is presented within a certain period of time of the video. In one example, audio video synchronization may occur as long as the video does not lead the audio by more than 30 milliseconds ("ms"), and the video does not lag the audio by more than 100 ms. An audio video synchronization error may be described as the presentation of unsynchronized audio and video.

To combat an audio video synchronization error, the media device may drop video frames. Dropping video frames may comprise withholding the render module from rendering the video frames. In one example, the media device is presenting content such that video is lagging the audio. To combat this lagging, the media device drops a certain amount of video frames. By dropping the video frames, the media device reduces the period of time that would have taken to process the video frames. This reduction in time results in a reduction of the lag of the video frames. Accordingly, dropping video frames may reduce or eliminate audio video synchronization errors. A drop in a relatively large number of video frames may be more obvious to a user when compared to a drop in a relatively small amount of video frames. Rather than dropping a relatively large number of video frames at a single time, the media device may be configured to drop a fewer amount of video frames more frequently. When fewer video frames are dropped more frequently, the dropping of the frames may go unnoticed to the user, or may be less obtrusive.

To maintain presentation of the content, the media device may use one or more buffer queues. The buffer queues may enable certain threads of the media device to operate without being held up by other threads. For example, the media device may execute a first thread to parse the streamed content such that the video frames are separated from the audio frames. The first thread may store the parsed video frames within a first buffer queue. The media device may execute a second thread to access the parsed video frames from the first buffer queue, and decrypt the parsed video frames. The second thread may store the decrypted video frames within a second buffer queue. The media device may execute a third thread to access the decrypted video frames from the second buffer queue, and decode the decrypted video frames. By using the buffer queues, the threads may continue to process the video frames even if other threads have not finished processing the video frames. When the threads may continue to process the video frames, video freezes or glitches may be reduced or eliminated, improving the user experience of consuming the content.

In one example, one or more of the threads may fail to operate in response to a message loop module failing to operate. The message loop module may comprise a thread configured to establish communication between other elements of the media device such as other threads operating within the media device.

In some implementations, one or more threads may be configured to process data at an input side and process data at an output side. The media device may be configured such that the media device processes the data at the output side in response to a determination that the data at the input side has not been processed within a predetermined period of time. In one example, the media device implements a pipeline architecture comprising the following sequentially executed threads: a first thread to decode the video frames, and a second thread to render the video frames. The first thread is configured to process first data at an input side, and second data at an output side. In this example, if the media device determines that the data at the input side has not been processed within 10 ms, the media device processes the second data without reinitializing the pipeline architecture. Processing data without reinitializing may include processing the data without removing communication connections between the threads of the pipeline architecture. Such a configuration reduces or eliminates video freezes or glitches that may be perceived by the user.

The media device may be configured to implement a pipeline architecture. The pipeline architecture may be described as the sequential processes executed by certain elements of the media device. For example, the pipeline architecture may comprise the following sequential process: decrypting the video frames, decoding the video frames, and rendering the video frames. The pipeline architecture may comprise an HTML5 application which uses the secure zone module for executing certain processes.

To present the video frames, the media device may be configured to apply parameters to the video frames. The parameters may comprise values used to present the video frames. Different parameters may be applied to different video frames based on the resolution of the video frames. For example, at a first time, the server may stream first video frames having a first resolution. At a second time, the server may stream second video frames having a second resolution. The media device may be configured to apply first parameters to the first video frames, and second parameters to the second video frames. In one example, the server may provide the video frames having a different resolution in response to a change in the bandwidth between the media device and the server by an amount equal to or greater than a predetermined amount.

In one example, the media device is configured to implement a pipeline architecture comprising the following sequential processes: decrypting the video frames, decoding the video frames, and rendering the video frames. In response to receiving the second video frames having the second resolution, the media device may continue to present the content without reinitializing the pipeline architecture by applying the second parameters to the second video frames. Reinitializing the pipeline architecture may cause the presentation of the content to freeze. By continuing to present the content without reinitializing the pipeline architecture, potential video freezes may be reduced or eliminated, resulting in an improved user experience of consuming the content.

In some implementations, the media device is configured to enable the user to navigate within the content. For example, the user may navigate or seek from one video frame to another video frame, may rewind the video, may fast forward the video, and so forth. When the media device is requested to navigate from one video frame to another, the media device displays the requested video frame after a particular period of time. The period of time may exist because the media device may perform certain processes such as reinitializing certain buffer queues to display the requested video frame. During this period of time, certain media devices may be configured to present the last displayed frame which may be described as a stale frame. This stale frame may bother a user that is expecting to see the requested video frame. Rather than displaying the stale frame, the media device may generate and display a different video frame. This different video frame may comprise a black frame or an advertisement frame. Displaying a video frame different from the stale frame may keep the user from being bothered by the presentation of the stale frame.

The media device may be configured to pause the presentation of content. In one example, the media device executes various threads to present the content. The threads may include a first thread to decrypt the video frames, a second thread to decode the video frames, and a third thread to render the video frames. Certain media devices may be configured to pause the presentation of the content by suspending the execution of the first thread, resulting in the second and third threads continuing to process video frames.

When the second and third threads continue to process the video frames, video frames are presented after the suspension of the first thread. Continuing to present these video frames may bother or annoy the user of the media device because the user may expect the content presentation to stop when the user selects the pause button. In some implementations, the media device is configured to pause the presentation of the content by suspending the execution of the third thread, resulting in the content being paused quicker when compared to suspending the execution of the first thread. Pausing the content presentation more quickly may reduce or eliminate the user from being bothered by a relatively slower pausing process.

Illustrative System

FIG. 1 is an illustrative system 100 configured to improve content presentation. A user 102 is depicted with a corresponding media device 104 to present content 106 for consumption. While a single user 102 and a single media device 104 are shown, more than one user 102 may consume the content 106 at a given time, such as where multiple users 102 are watching the content 106 together.

The media device 104 may include televisions, tablet computers, personal computers, set-top boxes, gaming consoles, in-vehicle entertainment systems, portable media players, wearable computing devices and so forth. The media device 104 includes or is communicatively coupled to one or more display output devices suitable for presenting video.

The media device 104 may be coupled to a remote control using a communication link. The remote control may serve as an input device or input/output device for the media device 104. For example, the remote control may include one or more of a touch sensor, button, accelerometer, gyroscope, camera, microphone, speaker, haptic output device, and so forth. The communication link may be optical, radio frequency, acoustic, and so forth. In one implementation the communication link may use a personal area network interface, such as one compliant with the Bluetooth® specification. In some implementations, the remote control may comprise another device such as a smartphone, tablet computer, and so forth which is communicatively coupled to the media device 104.

The media device 104 may receive content 106 streamed over one or more networks (not shown) from one or more servers 108. The one or more networks may include one or more public networks such as the Internet, private networks, or a combination of both. The network, in turn, couples to a plurality of servers 108(1), 108(2), . . . , 108(S). As used in this disclosure, a letter within parenthesis such as "(S)" represents an integer value greater than zero. While a single server 108 is depicted, in some implementations the server 108 or the functions attributed to the server 108 may be provided by a plurality of devices. For example, the server 108 may exist as a virtualized server executing across a plurality of physical servers. In some implementations, the server 108 may be referred to as a content server.

The content 106 may include video frames 110, audio frames 112, and other data 114 such as subtitles, thumbnails, or metadata. The other data 114 may include parameters used by the media device 104 to perform various functions such as decoding. The parameters are discussed in more detail with regard to FIG. 13. The content 106 may be compatible with at least a portion of the MPEG-2 standard promulgated by the Motion Pictures Experts Group ("MPEG") or the H.264 standard developed by the Video Coding Experts Group and the MPEG. The content 106 may or may not be encrypted.

The server 108 may include a communication module 116 configured to establish and support communications with the media device 104 or other devices. For example, the communication module 116 may execute instructions which support transmission of data across a data network using the transmission control protocol/internet protocol ("TCP/IP").

The server 108 may include a content delivery module 118 configured to stream the content 106 to one or more of the media devices 104. The streaming of the content 106 may be initiated by a request from the media device 104, by the server 108, or another device.

The media device 104 may include a parse module 120 configured to process the content 106 received from the server 108. The parse module 120 may be configured to split the content 106 into separate files. For example, the content 106 may include the video frames 110, the audio frames 112, and the parse module 120 may split the content 106 such that the video frames 110 are separated from the audio frames 112. The video frames 110 may be separated from other data of the content 106 because the media device 104 may apply different processes to the video frames 110 such as processes described below.

The media device 104 may include a user interface module 122 is configured to provide a user interface to the user 102 and accept inputs responsive to the user interface. The user interface may include one or more visual, audible, or haptic elements. In one implementation, the user interface may be a web interface presented via the network and accessible to the users 102. In another implementation the user interface may comprise an API which enables communication such as sending requests for content 106 from the media device 104 to the server 108. The user interface may be configured to provide a graphical user interface using the display which includes a control to navigate within the content 106. The user interface may include control buttons such as the transport controls 124. In FIG. 1, the transport controls 124 include fast forward 124(1), rewind 124(2), seek 124(3), and pause 124(4). The transport controls 124 may include other buttons (not shown) such as play, record, and so forth.

The media device 104 may include a presentation module 126 configured to present the content 106. The presentation module 126 may be configured to work in conjunction with the user interface module 122 to allow the user 102 to control presentation of the content 106.

The media device 104 may include a decrypt module 128 configured to decrypt the video frames 110. The decrypt module 128 may decrypt the video frames 110 using one or cryptographic keys (not shown). Another server (not shown) may be configured to provide the one or more cryptographic keys using the network described above.

The media device 104 may include a decode module 130 configured to decode the video frames 110. The media device 104 may include a render module 132 configured to render the video frames 110. Rendering the video frames 110 may be described as a process of generating an image from the decoded video frames 110. The presentation module 126 may display the rendered video frames 110 using one or more display devices.

The media device 104 may include a secure zone module 134 configured to support one or more of the threads. The secure zone module 134 may provide protection against software attacks. For example, the content 106 may be decrypted within the secure zone module 134, ensuring that the content 106 may not be copied by a hacker.

The media device 104 may include a frame generation module 136. The frame generation module 136 may be configured to generate a frame for presentation. In one example, the frame generation module 136 generates a colored frame such as a black frame 138. As discussed in more detail with regard to FIG. 4, the black frame 138 may be displayed after certain transport control buttons 124 are selected. In another example, the frame generation module 136 may generate an advertisement frame 140. As discussed in more detail with regard to FIG. 4, the advertisement frame 140 may be displayed after certain transport control buttons 124 are selected.

In one example, the media device 104 displays the black frame 138 by overlaying the black frame 138 atop an already displayed video frame 110. In another example, the media device 104 displays the black frame 138 by configuring a z-index value associated with a browser being implemented by the media device 104. The z-index value may be used by the browser to determine a stack order associated with a window of the browser.

The media device 104 may include a lag event module 142. The lag event module 142 may be configured to determine whether a lagging event occurs. In one example, the lag event module 142 determines that the lagging event occurs when the presentation of the audio frames 112 departs from synchronization with the video frames 110 by a predetermined number. As discussed above, synchronization relates to the relative timing of the presentation of audio and video. The lagging event is discussed in more detail with regard to FIG. 6. As discussed in more detail below, the media device 104 may drop one or more video frames 110 in response to the occurrence of a lagging event.

The media device 104 may include a frame drop module 144 configured to drop one or more frames. For example, the frame drop module 144 may drop one or more video frames 110. Dropping a frame may comprise withholding certain modules from processing the frame. For example, the frame drop module 144 may cause the render module 132 to withhold from rendering one or more video frames 110. The frame drop module 144 may drop one or more video frames 110 in response to a determination that the lagging event occurred. Dropping video frames 110 is discussed in more detail with regard to FIG. 6.

The media device 104 may include a message loop module 146. The message loop module 146 may comprise a thread configured to establish communication between certain elements of the media device 104. In one example, the message loop module 146 provides a message from the decode module 130 to the render module 132, indicating that a particular decoded video frame 110 may be rendered. A failure of the message loop module 146 to operate may cause a pipeline architecture to fail. The pipeline architecture may be described as the sequential processes executed by certain elements of the media device 104. For example, the pipeline architecture may comprise the following sequential process: parsing the content 106 into the video frames 110, decrypting the video frames 110, decoding the video frames 110, rendering the video frames 110, and displaying the video frames 110.

The media device 104 may include one or more buffer queues 148(1), 148(2), 148(3), . . . , 148(B). To maintain presentation, the media device 104 may buffer a portion of the streamed content 106. The parse module 120 may be configured to store parsed video frames 110 in the buffer queue 148(1). The decrypt module 128 may be configured to access the video frames 110 from the buffer queue 148(1), decrypt the video frames 110, and store the decrypted video frames 110 in the buffer queue 148(2). The decode module 130 may be configured to access the decrypted video frames 110 from the buffer queue 148(2), decode the decrypted video frames 110, and store the decoded video frames 110 in the buffer queue 148(3). The render module 132 may be configured to access the decoded video frames 110 from the buffer queue 148(3), render the decoded video frames 110, and store the rendered video frames 110 in the buffer queue 148(4). The presentation module 126 may be configured to access the rendered video frames 110 from the buffer queue 148(4), and display the rendered video frames 110.

The media device 104 may include a MSE module 150 configured to support the one or more threads. The MSE module 150 may provide an API for generating media streams for playback. The MSE module 150 may enable the media device 104 to perform functions such as ABS and time shifting live streams. The MSE module 150 may allow the markup language applications to use script to generate media streams for presentation. The MSE module 150 may enable the media device to perform functions such as ABS and time shifting live streams. The MSE module 150 is compliant with at least a portion of the Media Source Extensions as promulgated by the W3C.

Other information 152 may be provided by the media device 104 to the server 108, or by the server 108 to the media device 104. The other information 152 may include various data such as data indicating an amount of memory available, data indicating an identification of the media device 104 or server 108, one or more advertisement frames 140, metric data used to determine the resource consumption, and so forth. In some implementations, the other information 152 may comprise configuration data used by the media device 104 to control the period of time that the advertisement frame 140 is displayed. This configuration data may be generated based on user input received at the server 108.

Certain functions perform by the various modules described herein may be described as being executed as threads. For example, a first thread may comprise the functions performed by the parse module 120, a second thread may comprise the functions performed by the presentation module 126, a third thread may comprise the functions performed by the decode module 130, a fourth thread may comprise the functions performed by the render module 132, a fifth thread may comprise the functions performed by the message loop module 146.

Figure 2:
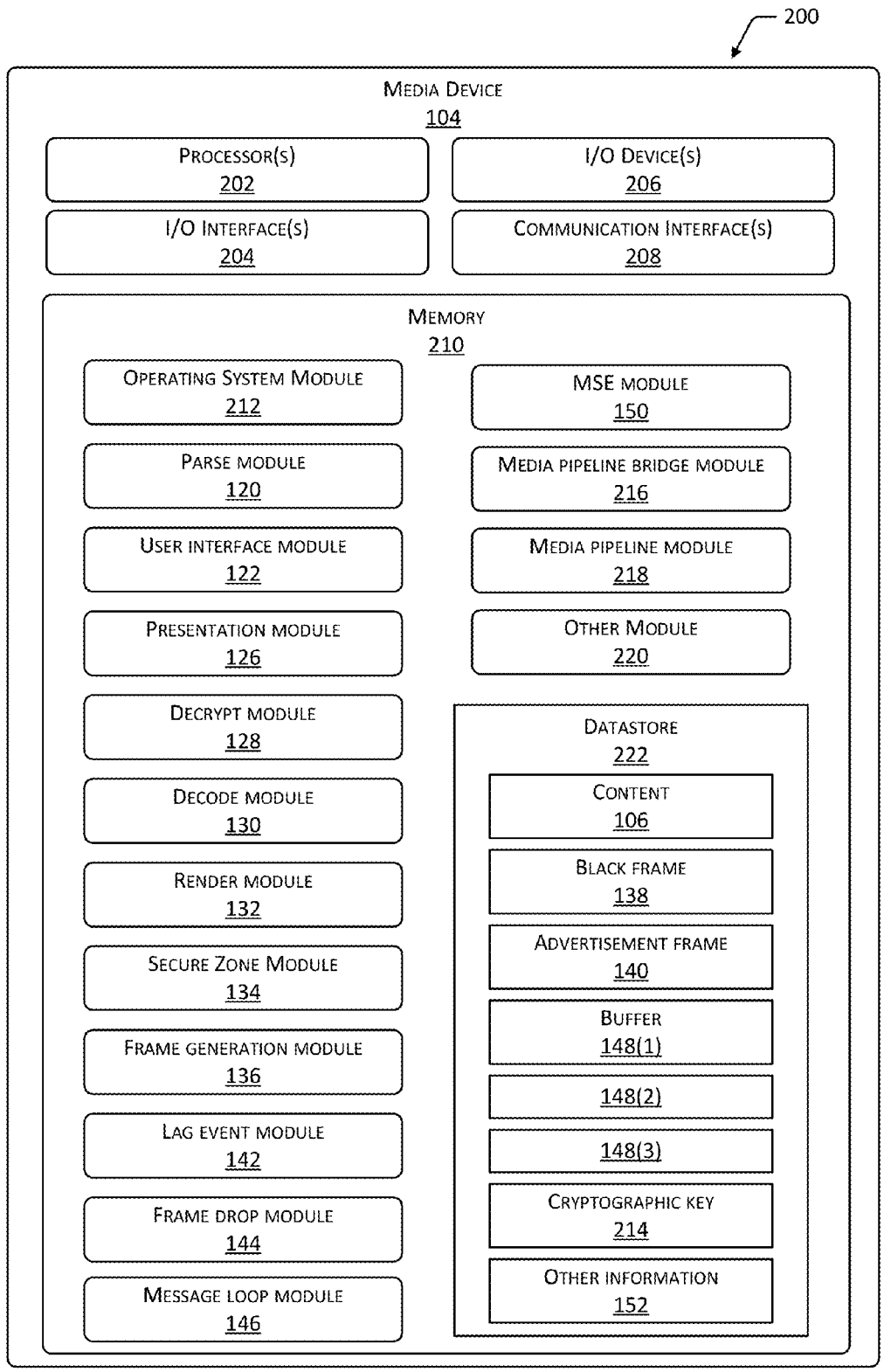
FIG. 2 is a block diagram of a media device configured to improve content presentation.

FIG. 2 is a block diagram 200 of the media device 104. As described above the media device 104 may improve content 106 presentation during streaming. The media device 104 may include one or more hardware processors 202 (or "processors") configured to execute stored instructions. The processors 202 may comprise one or more cores.

The media device 104 includes at least one I/O interface 204 which enables portions of the media device 104 (e.g., the hardware processor 202) to communicate with other devices. The I/O interface 204 may be configured to implement various protocols, such as inter-integrated circuit ("I2C"), serial peripheral interface bus ("SPI"), Universal Serial Bus ("USB"), RS-232, HDMI, TOSLINK, Bluetooth®, and so forth. The at least one I/O interface 204 may be operatively connected to at least one I/O device 206. In some implementations, certain I/O devices 206 are physically incorporated with the media device 104 or externally placed.

The at least one I/O interface 204 may be operatively connected to one or more I/O devices 206. The I/O devices 206 may include input devices such as one or more of a keyboard, a touch sensor, and so forth. The I/O devices 206 may also include output devices such as one or more of a display, printer, and so forth. In some embodiments, the I/O devices 206 may be physically incorporated with the media device 104 or may be externally placed and communicatively coupled thereto.

The media device 104 may also include at least one communication interface 208. The at least one communication interfaces 208 may be configured to provide communications between the media device 104 and other devices such as the server 108, routers, access points, other servers, and so forth. The communication interfaces 208 may include personal area networks, wireless local area networks, wireless wide area networks, and so forth. The media device 104 may communicate with the remote control using one or more of the communication interfaces 208. For example, the media device 104 may communicate with the remote control using a Bluetooth® personal area network.

The media device 104 may also include one or more busses or other internal communications hardware or software that allow for the transfer of data between the various modules and components of the media device 104.

As illustrated in FIG. 2, the media device 104 may include at least one memory or memory device 210. The memory 210 may include at least one non-transitory computer-readable storage media ("CRSM"). The CRSM may include at least one of an electronic storage medium, a magnetic storage medium, an optical storage medium, a quantum storage medium, or a mechanical computer storage medium. The memory 210 may include computer readable instructions, data structures, program modules, and other data for the operation of the media device 104.

The memory 210 may include at least one OS module 212. The OS module 212 is configured to manage hardware resource devices such as the I/O interfaces 204, the I/O devices 206, the communication interfaces 208, the device interfaces, and provide various services to applications or modules executing on the hardware processor 202. The memory 210 may also store at least one of the following modules which may be executed as foreground applications, background tasks, daemons, and so forth.

The memory 210 may include a parse module 120 configured to process the content 106 received from the server 108. The parse module 120 may be configured to split the content 106 into separate files. For example, the content 106 may include the video frames 110, the audio frames 112, and the parse module 120 may split the content 106 such that the video frames 110 are separated from the audio frames 112.

The memory 210 may include the user interface module 122 configured to provide the user interface to the user 102 using the I/O devices 206 and accept inputs received from the user input I/O devices 206. The user interface may include one or more visual, audible, or haptic elements. The user interface may be a web interface presented via the network and accessible to the users 102. The user interface may comprise an API which enables communication such as sending requests for content 106 from the media device 104 to the server 108. The user interface may be configured to provide a graphical user interface using the display which includes a control to navigate within the content 106.

The user interface may include control buttons such as the transport controls 124. The transport controls 124 may include a variety of buttons such as fast forward 124(1), rewind 124(2), seek 124(3), pause 124(4), play, record, stop and so forth.

The memory 210 may include a presentation module 126 configured to present the content 106. The presentation module 126 may be configured to work in conjunction with the user interface module 122 to allow the user 102 to control presentation of the content 106.

The memory 210 may include the decrypt module 128 configured to decrypt the video frames 110. The decrypt module 128 may decrypt the video frames 110 using one or cryptographic keys 214. Another server (not shown) may be configured to provide the one or more cryptographic keys 214 using the network described above. In some implementations, the decryption of the video frames 110 occurs within the secure zone module 134. As described above, the secure zone module 134 may provide protection against software attacks.

The memory 210 may include the decode module 130 configured to decode the video frames 110. In some implementations, the decoding of the video frames 110 occurs within the secure zone module 134.

The memory 210 may include the render module 132 configured to render the video frames 110. Rendering the video frames 110 may be described as a process of generating an image from a decoded video frame 110. The presentation module 126 may display the rendered video frames 110 using one or more display devices.

The memory 210 may include the secure zone module 134. The secure zone module 134 may be configured to provide the functionality associated with maintaining and performing operations within a secure zone. For example, the secure zone module 134 may comprise a secure OS kernel configured to implement at least a portion of the ARM TrustZone®.

The memory 210 may include the secure zone module 134 configured to support one or more of the threads. The secure zone module 134 may provide protection against software attacks. For example, the content 106 may be decrypted within the secure zone module 134, ensuring that the content 106 may not be copied by a hacker.

The memory 210 may include the frame generation module 136 configured to generate a frame for presentation. The generated frame may comprise a colored frame such as the black frame 138. In another example, the generated frame may comprise the advertisement frame 140. The media device 104 may display the black frame 138 by overlaying the black frame 138 atop an already displayed video frame 110. In another example, the media device 104 displays the generated frame (e.g., the black frame 138 or the advertisement frame 140) by configuring a z-index value associated with a browser being implemented by the media device 104. The z-index value may be used by the browser to determine a stack order associated with a window of the browser.

The memory 210 may include the lag event module 142. The lag event module 142 may be configured to determine whether the lagging event occurs. The lagging event may occur when the presentation of the audio frames 112 departs from synchronization with the video frames 110 by a predetermined number. The media device 104 may drop one or more video frames 110 in response to a determination that the occurrence of the lagging event has occurred.

The memory 210 may include the frame drop module 144 configured to drop one or more frames. Dropping a frame may comprise causing the render module 132 to withhold from rendering the frame. The frame drop module 144 may drop one or more video frames 110 in response to a determination that the lagging event occurred.

The memory 210 may include the message loop module 146. The message loop module 146 may comprise a thread configured to establish communication between certain elements of the media device 104. For example, the message loop module 146 may provide a message from the decode module 130 to the render module 132, indicating that a particular decoded video frame 110 may be rendered. A failure of the message loop module 146 to operate may cause the pipeline architecture to fail.

The memory 210 may include the MSE module 150 configured to support the one or more threads. The MSE module 150 may provide an API for generating media streams for playback. The MSE module 150 may enable the media device 104 to perform functions such as ABS and time shifting live streams.

The memory 210 may include a media pipeline bridge module 216 configured to provide connectivity between the MSE module 150 and a media pipeline module 218. In one implementation, the media pipeline module 218 may comprise the MediaCodec portion of the non-secure OS module. For example, the media pipeline module 218 may comprise a class which may be used to access low-level media codec components, such as encoders and decoders. The low-level media code components may be operable by the secure zone.

The memory 210 may include other modules 220. For example, an authentication module may be configured to authorize delivery of the content 106 to a particular media device 104.

The memory 210 may also include a datastore 222 to store information. The datastore 222 may use a flat file, database, linked list, tree, or other data structure to store the information. In some implementations, the datastore 222 or a portion of the datastore 222 may be distributed across one or more other devices including servers, network attached storage devices, and so forth.

The datastore 222 may store at least one of a portion of the content 106, the black frame 138, the advertisement frame 140, the other information 152, or the cryptographic key 214. The other information 152 may include user preferences, account login information, and so forth.

Figure 3:
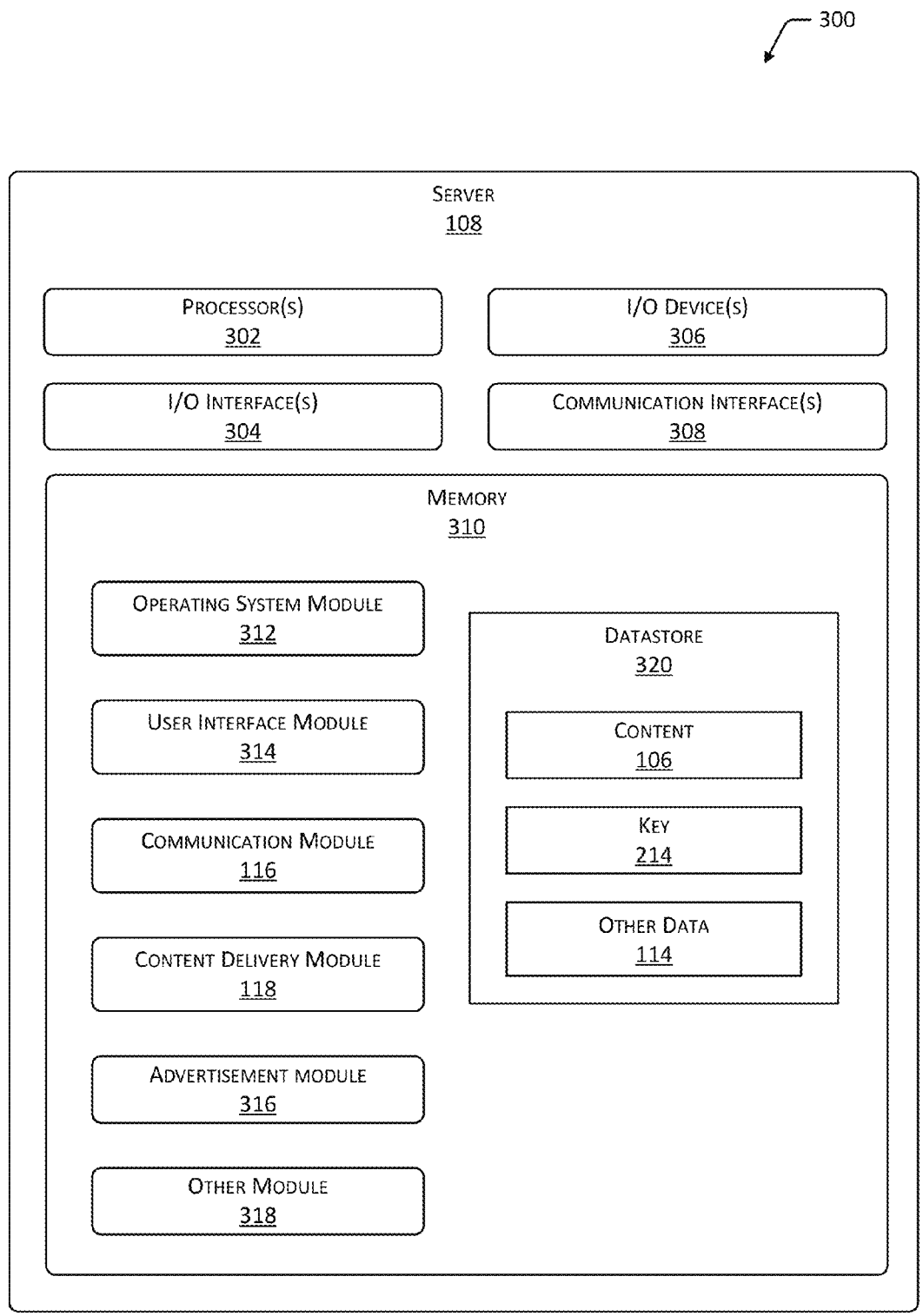
FIG. 3 is a block diagram of a server configured to stream content to the media device.

FIG. 3 is a block diagram 300 of the server 108. As described above the server 108 may stream content 106 to the media device 104. The functions associated with the server 108 described in this disclosure may be implemented by one or more servers 108, and by one or more entities. For example, in one implementation, one server 108 may provide and distribute the content 106 while another generates other data 114 such as metadata. The one or more servers 108 may be physical server devices or virtual servers executing on physical server devices.

The server 108 may include at least one hardware processor 302 (or "processor") configured to execute stored instructions. The at least one hardware processor 302 may comprise one or more cores.

The server 108 includes at least one I/O interface 304 which enables portions of the server 108 (e.g., the hardware processor 302) to communicate with other devices. The I/O interface 304 may be configured to implement various protocols, such as I2C, SPI, USB, RS-232, HDMI, TOSLINK, Bluetooth®, and so forth. The at least one I/O interface 304 may be operatively connected to at least one I/O device 306. In some implementations, certain I/O devices 306 are physically incorporated with the server 108 or externally placed.

The at least one I/O interface 304 may be operatively connected to one or more I/O devices 306. The I/O devices 306 may include input devices such as one or more of a keyboard, a touch sensor, and so forth. The I/O devices 306 may also include output devices such as one or more of a display, printer, and so forth. In some embodiments, the I/O devices 306 may be physically incorporated with the server 108 or may be externally placed and communicatively coupled thereto.

The server 108 may include at least one communication interface 308. The communication interface 308 may be configured to provide communications between the server 108 and other devices such as the media device 104, routers, access points, other servers 108, and so forth. The communication interface 308 may include an Ethernet interface which connects to the network.

The server 108 may also include one or more busses or other internal communications hardware or software that allow for the transfer of data between the various modules and components of the server 108.

As illustrated in FIG. 3, the server 108 may include at least one memory or memory device 310. The memory 310 may include at least one non-transitory CRSM. The CRSM may include at least one of an electronic storage medium, a magnetic storage medium, an optical storage medium, a quantum storage medium, or a mechanical computer storage medium. The memory 310 may include computer readable instructions, data structures, program modules, and other data for the operation of the server 108.

The memory 310 may include at least one OS module 312. The OS module 312 may be configured to manage hardware resources such as the I/O interface 304, the I/O devices 306, the communication interface 308, and provide various services to applications or modules executing on the hardware processor 302. The memory 310 may also store at least one of the following modules which may be executed as foreground applications, background tasks, daemons, and so forth.

The memory 310 may include a user interface module 314 configured to provide a user interface to the user 102 or to the media device 104. In one implementation, the user interface may be a web interface presented via the network and accessible to the user 102. In another implementation the user interface may comprise an API which enables communication such as sending requests for content 106 from the media device 104 to the server 108.

The memory 310 may include the communication module 116 configured to establish and support communications with the media device 104 or other devices. For example, the communication module 116 may execute instructions which support transmission of data across a data network using the transmission control protocol/internet protocol ("TCP/IP").

The memory 310 may include the content delivery module 118 configured to stream the content 106 to one or more of the media devices 104. The streaming of the content 106 may be initiated by a request from the media device 104, by the server 108, or another device.

The memory 310 may include an advertisement module 316 configured to select or generate one or more of the advertisement frames 140. The advertisement module 316 may generate or select certain advertisement frames 140 based on various factors. For example, the advertisement frames 140 may be selected based on the content 106 that is streamed by the server 108 to the media device 104. If the streamed content 106 relates to sports, the advertisement module 316 may select advertisement frames 140 that are related to sports. In another example, the advertisement module 316 may select certain advertisement frames 140 based on characteristics of the media device 104. For example, the advertisement frames 140 may be selected based on information indicating the manufacturer of the media device 104, the model of the media device 104, the OS of the media device 104, and so forth. The server 108 may provide the selected advertisement frames 140 to the media device 104 in response to an occurrence of a seek event.

The memory 310 may include other modules 318. For example, an authentication module may be configured to authorize delivery of the content 106 to a particular media device 104.

The memory 310 may also include a datastore 320 to store information. The datastore 320 may use a flat file, database, linked list, tree, or other data structure to store the information. In some implementations, the datastore 320 or a portion of the datastore 320 may be distributed across one or more other devices including servers, network attached storage devices, and so forth.

The datastore 320 may store the content 106, the key 214, or the other data 114. The other data 114 may include user preferences, account login information, and so forth.

Figure 4:
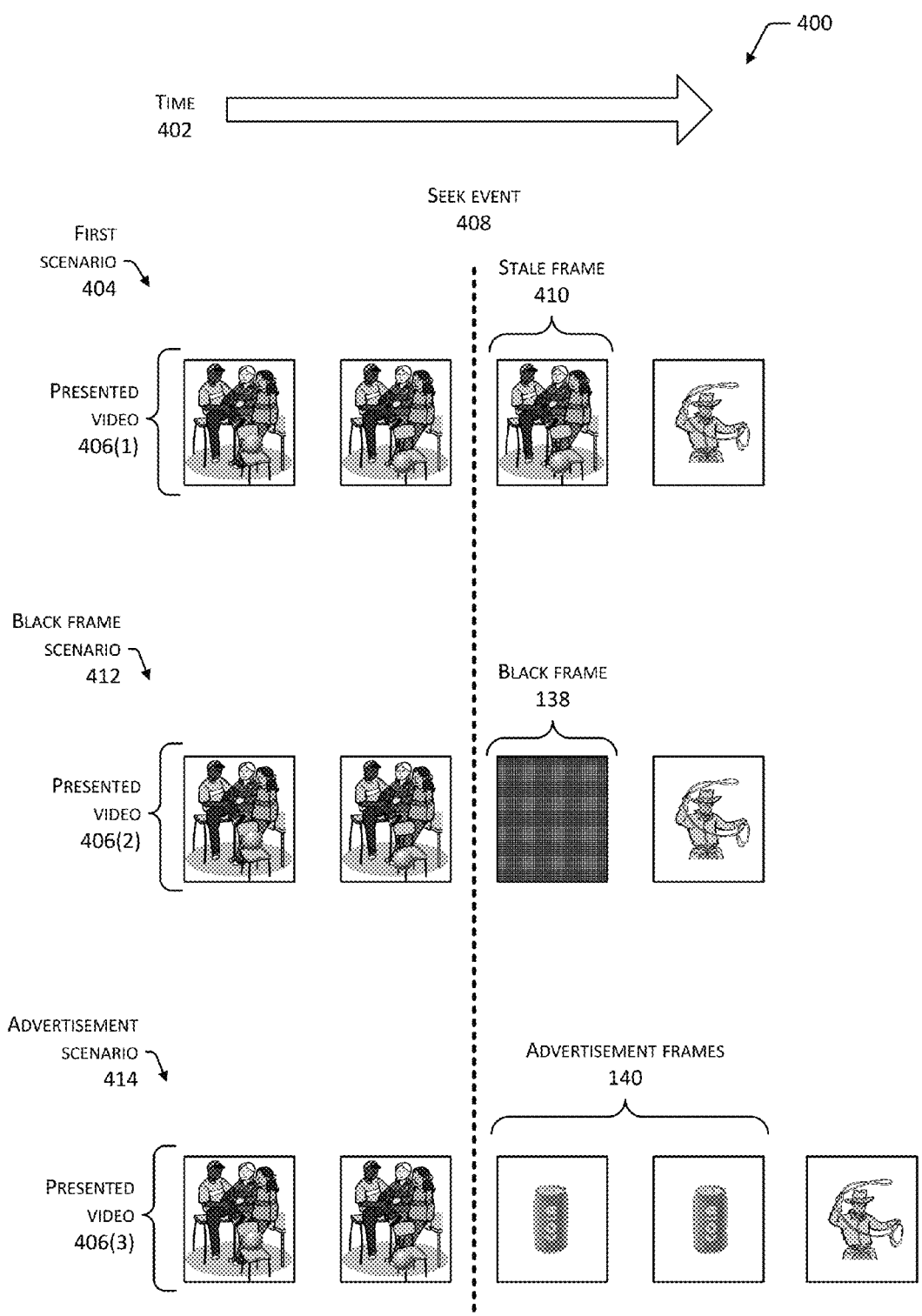
FIG. 4 is an illustration of displaying a generated frame after a seek event.

FIG. 4 depicts an illustration 400 of displaying one or more generated frames after a seek event. In this illustration, time increases from left to right, as indicated by the arrow 402.

In a first scenario 404, presented video 406(1) is depicted. A seek event 408 occurs. The seek event 408 may occur when the user 102 requests for the media device 104 to present a video frame different from what the media device 104 is currently displaying. In one example, the seek event 408 occurs in response to the media device 104 receiving a command to present a particular video frame 110. The user 102 may select the seek button 124(3) which allows the user 102 to select a particular frame for presentation. In another example, the seek event 408 may occur in response to the user 102 selecting the fast forward 124(1) or rewind 124(2) button. In the first scenario 404, the media device 104 presents a stale frame 410 after the occurrence of the seek event 408 and before the presentation of the requested video frame. In this example, the requested video frame is depicted as a cowboy. Once the seek event 408 occurs, the media device 104 may begin to perform certain processes (e.g., reinitializing one or more buffer queues 148) to display the requested frame. These processes may occur over a particular period of time. While the media device 104 performs these processes, the media device 104 may display the stale frame 410.

In a black frame scenario 412, presented video 406(2) is depicted. In the black frame scenario 412, the seek event 408 occurs. The media device 104 presents the black frame 138. The media device 104 may display the black frame 138 by overlaying the black frame 138 atop the stale frame 410. In another example, the media device 104 may display the black frame 138 by configuring a z-index value associated with a browser being implemented by the media device 104. The z-index value may be used by the browser to determine a stack order associated with a window of the browser.

In an advertisement frame scenario 414, presented video 406(3) is depicted. In the advertisement scenario 414, the media device 104 presents the advertisement frames 140 once the seek event 408 occurs. In this example, the media device 104 is configured to display the advertisement frames 140 for a predetermined period of time. This predetermined period of time may be configurable. For example, an administrative user of the server 108 may cause the server 108 to provide the configuration data to the media device 104 such that the media device 104 will display the advertisement frames 140 for ten seconds.

Once a seek event occurs 408, the media device 104 may perform certain processes to display the video frame 110 that is being requested to be displayed. These processes may be executed over a period of time. During this period of time, the media device 104 may display the generated frame (e.g., the black frame 138 or the advertisement frame 140).

Figure 5:
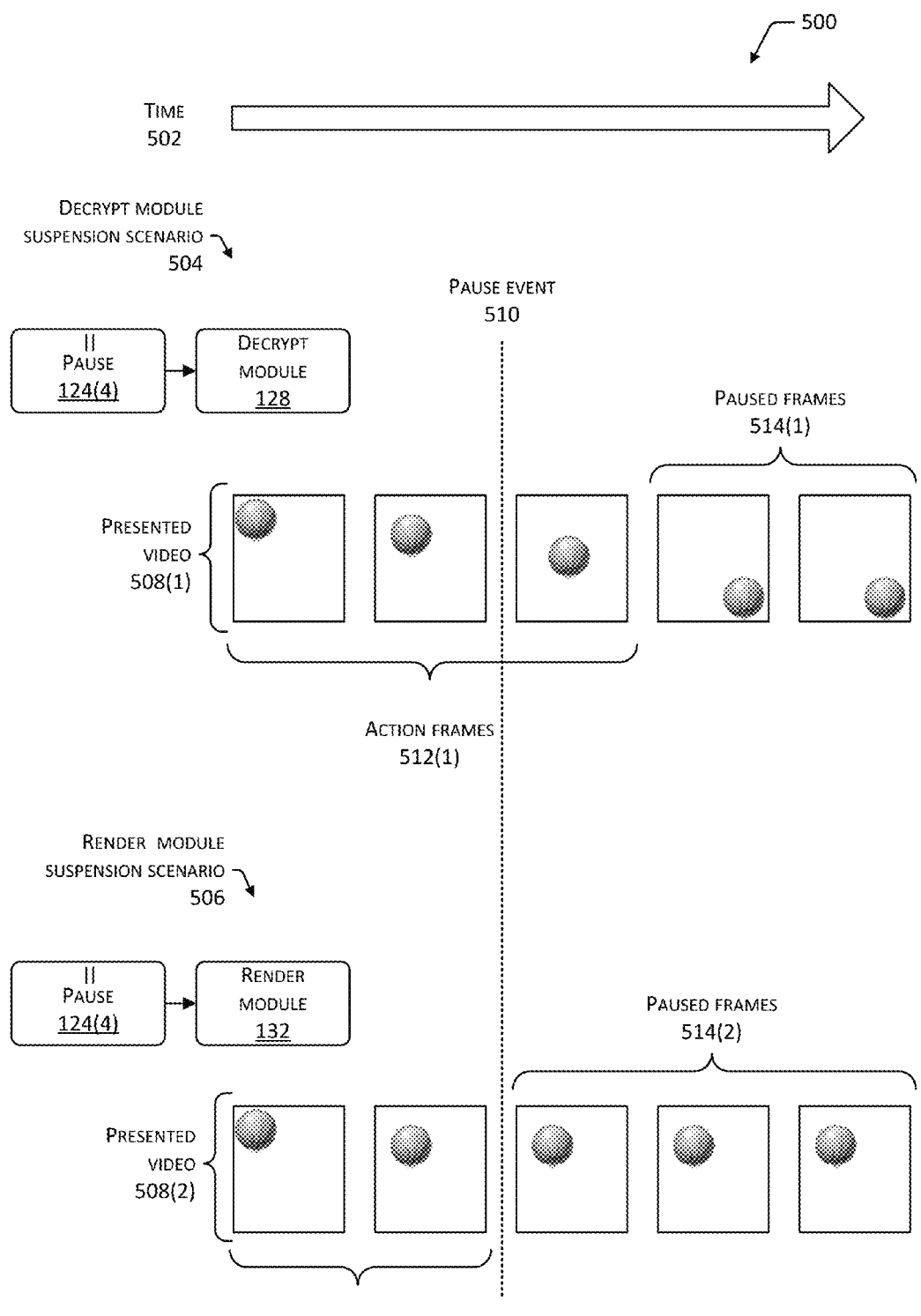
FIG. 5 is an illustration of displaying paused frames in response to suspending the execution of the render module.

FIG. 5 is an illustration 500 of displaying paused frames in response to suspending the execution of the render module 132. In this illustration, time increases from left to right, as indicated by the arrow 502. The following two scenarios are presented: a decrypt module suspension scenario 504 and a render module suspension scenario 506. In the decrypt module suspension scenario 504, presented video 508(1) is depicted. A pause event occurs 510. The pause event 510 may occur in response to the media device 104 receiving a command to pause. In one example, the pause event 510 occurs in response to the user 102 selecting the pause button 124(4).

A portion of the presented video 508(1) comprises action frames 512(1). The action frames 512(1) are displayed in sequence to produce apparent motion. When the media device 104 is configured to pause the presentation of the content 106 by suspending the execution of the decrypt module 128, the media device 104 displays the action frames 512(1) such that the user 102 perceives apparent motion for a period of time after the occurrence of the pause event 510. The presented video 508(1) also includes paused frames 514(1).

In the render module suspension scenario 506, presented video 508(2) is depicted. The pause event occurs 510. A portion of the presented video 508(2) comprises action frames 512(2). When the media device 104 is configured to pause the presentation of the content 106 by suspending the execution of the render module 132, the media device 104 displays the action frames 512(2) such that the user 102 does not perceive apparent motion for a period of time after the occurrence of the pause event 510. The presented video 508(2) also includes paused frames 514(2) which are displayed once the pause event 510 occurs. When compared to suspending the execution of the decrypt module 128, suspending the execution of the render module 132 provides a faster perception of the video being paused.

Figure 6:
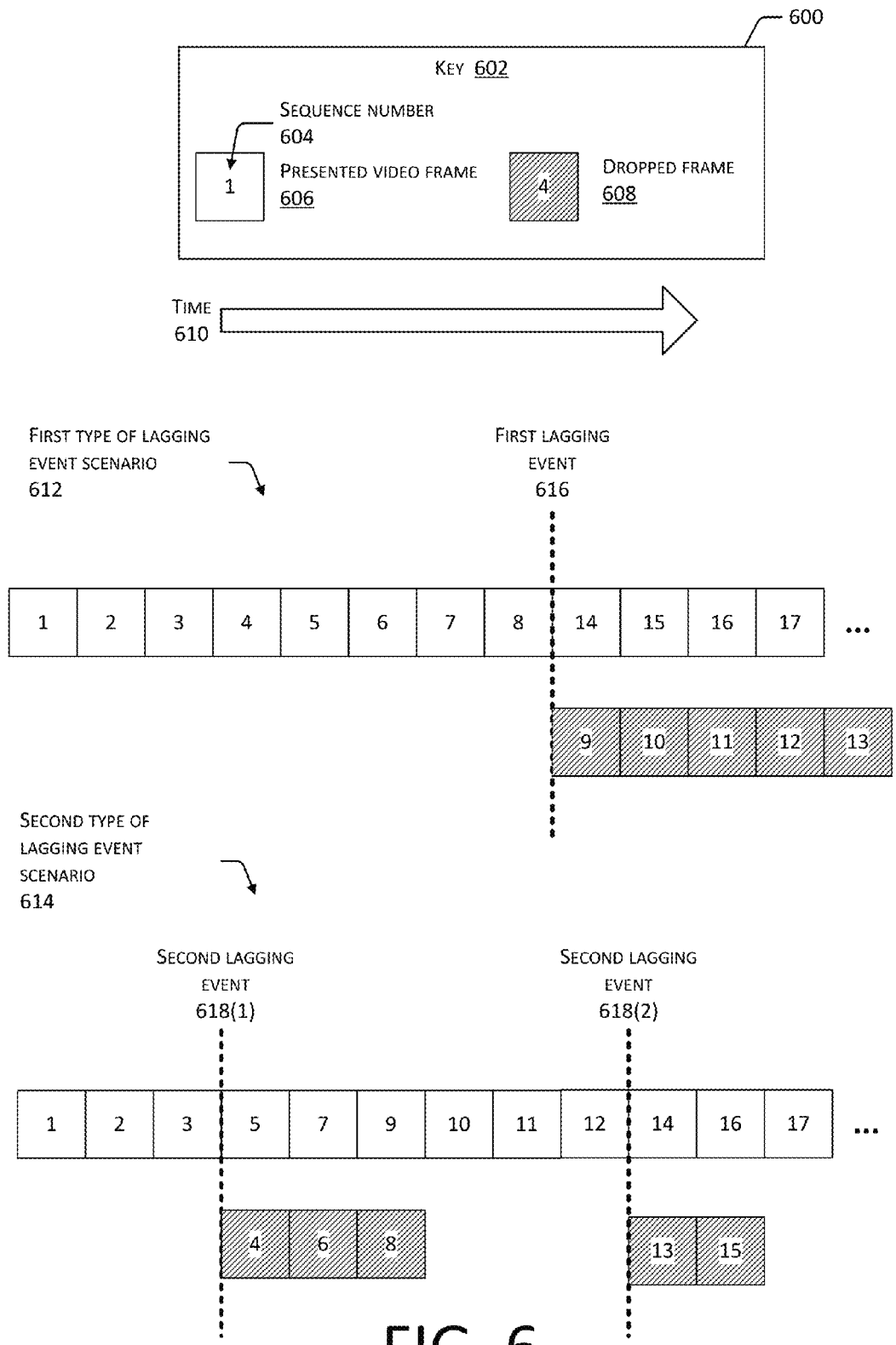
FIG. 6 is an illustration of dropping video frames based on lagging events.

FIG. 6 is an illustration 600 of dropping video frames 110 based on lagging events. A key 602 is depicted indicating graphic representations including sequence numbers 604 of the presented video frames 606 and the dropped frames 608. In this illustration, time increases from left to right, as indicated by arrow 610.

The following two scenarios are depicted: a first type of lagging event scenario 612 and a second type of lagging event scenario 614. In the first type of lagging event scenario 612, a first lagging event 616 occurs. The media device 104 may determine that the first lagging event 616 occurs in response to a determination that the presentation of the audio frames 112 (not shown) depart from a synchronization with the presented video frames 606 by a first predetermined number. In this example, the first predetermined number may be at least five. In the first type of lagging event scenario 612, once the first lagging event 616 occurs, the media device 104 drops five frames (i.e., dropped frames 608 depicted with the following sequence numbers 604: 9 to 13).

In the second type of lagging event scenario 614, second lagging event 618(1) and 618(2) occur. The media device 104 may determine that the second lagging event 618(1) and 618(2) occurs in response to a determination that the presentation of the audio frames 112 (not shown) depart from a synchronization with the presented video frames 606 by a second predetermined number. In this example, the second predetermined number may be at least two. In the second type of lagging event scenario 614, once the second lagging event 618(1) occurs, the media device 102 drops three frames (i.e., dropped frames 608 depicted with the following sequence numbers 604: 4 to 8). Once the second lagging event 618(2) occurs, the media device 102 drops two frames (i.e., dropped frames 608 depicted with the following sequence numbers 604: 13 to 15).

The media device 102 in the second type of lagging event scenario 614 drops a fewer amount of video frames 110 after two lagging events 618(1) and 618(2), individually, when compared to the media device 104 in the first type of lagging event scenario 612. That is, in the first type of lagging event scenario 612, the media device 104 drops a larger amount of video frames 110 after a single lagging event 616 when compared to the amount of video frames 110 dropped after the second lagging event 618(1) or 618(2). By dropping a fewer amount of video frames 110 over multiple lagging events 618(1) and 618(2), the presented video frames 604 may be presented such that user 102 does not perceive a frame drop. When a relatively large amount of video frames 110 are dropped, the user 102 perceives an irregular display of content 106. When fewer video frames 110 are dropped more frequently, the dropping of the video frames 110 may go unnoticed to the user 102.

Figure 7:
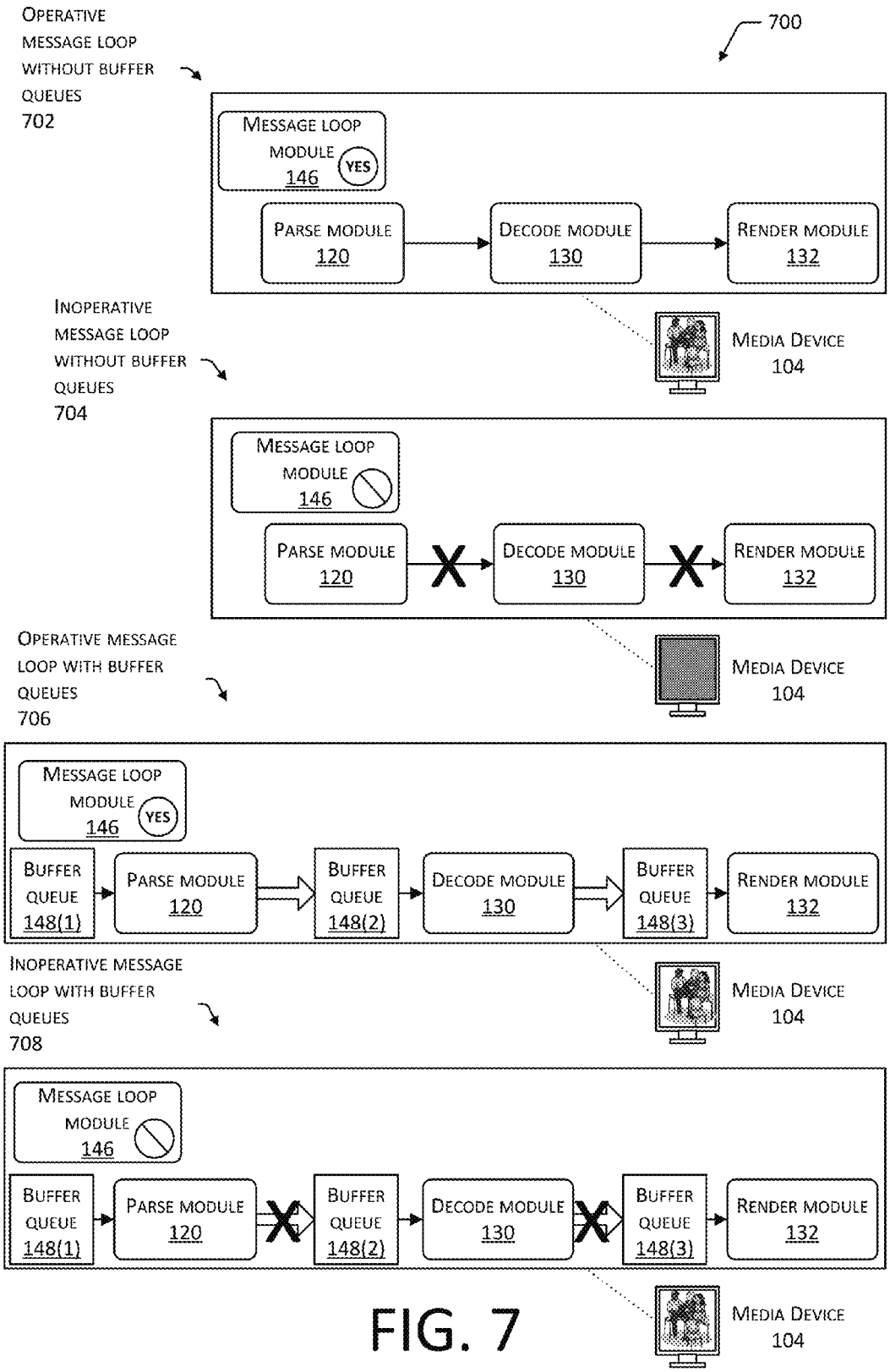
FIG. 7 is an illustration of various modules accessing frames from buffer queues.

FIG. 7 is an illustration 700 of various modules accessing video frames 110 from buffer queues 148. The media device 104 having an operative message loop without a buffer queue 702 is depicted. Under this configuration, the message loop module 146 is configured to establish communication between the parse module 120, the decode module 130, and the render module 132. The decode module 130 accesses video frames 110 from the parse module 120, and the render module 132 accesses video frames from the decode module 130.

The media device 104 having an inoperative message loop without a buffer queue 704 is depicted. In this scenario, the message loop module 146 has failed. Because the message loop module 146 has failed, the decode module 130 is not able to decode video frames 110 provided by the parse module 120, and the render module 132 may not render video frames 110 provided by the decode module 130.

The media device 104 having an operative message loop with a buffer queue 706 is depicted. In this configuration, the media device 104 includes the buffer queues 148(1), 148(2) and 148(3). The parse module 120 may be configured to access content 106 from the buffer queue 148(1), parse the content 106 such that the video frames 110 are separated from the content 106, and store the parsed video frames 110 in the buffer queue 148(2). The decode module 130 may be configured to access the parsed video frames 110 from the buffer queue 148(2), decode the parsed video frames 110, and store the decoded video frames 110 in the buffer queue 148(3). The render module 132 may be configured to access the decoded video frames 110 from the buffer queue 148(3), and render the decoded video frames 110.

The media device 104 having an inoperative message loop with a buffer queue 708 is depicted. In this scenario, the message loop module 146 has failed. Although the message loop module 146 has failed, the parse module 120, the decode module 130, and the render module 132 may continue to operate because these modules may access data from the buffer queues 148. For example, as depicted in FIG. 7, although the parse module 120 may be unable to store video frames 110 in the buffer queue 148(2), the decode module 130 may continue to access the video frames 110 which have been previously stored in the buffer queue 148(2) by the parse module 120. Because the modules may continue to process the video frames 110, video freezes or glitches may be reduced or eliminated, improving the user experience of consuming the content 106.

Illustrative Processes

Figure 8:
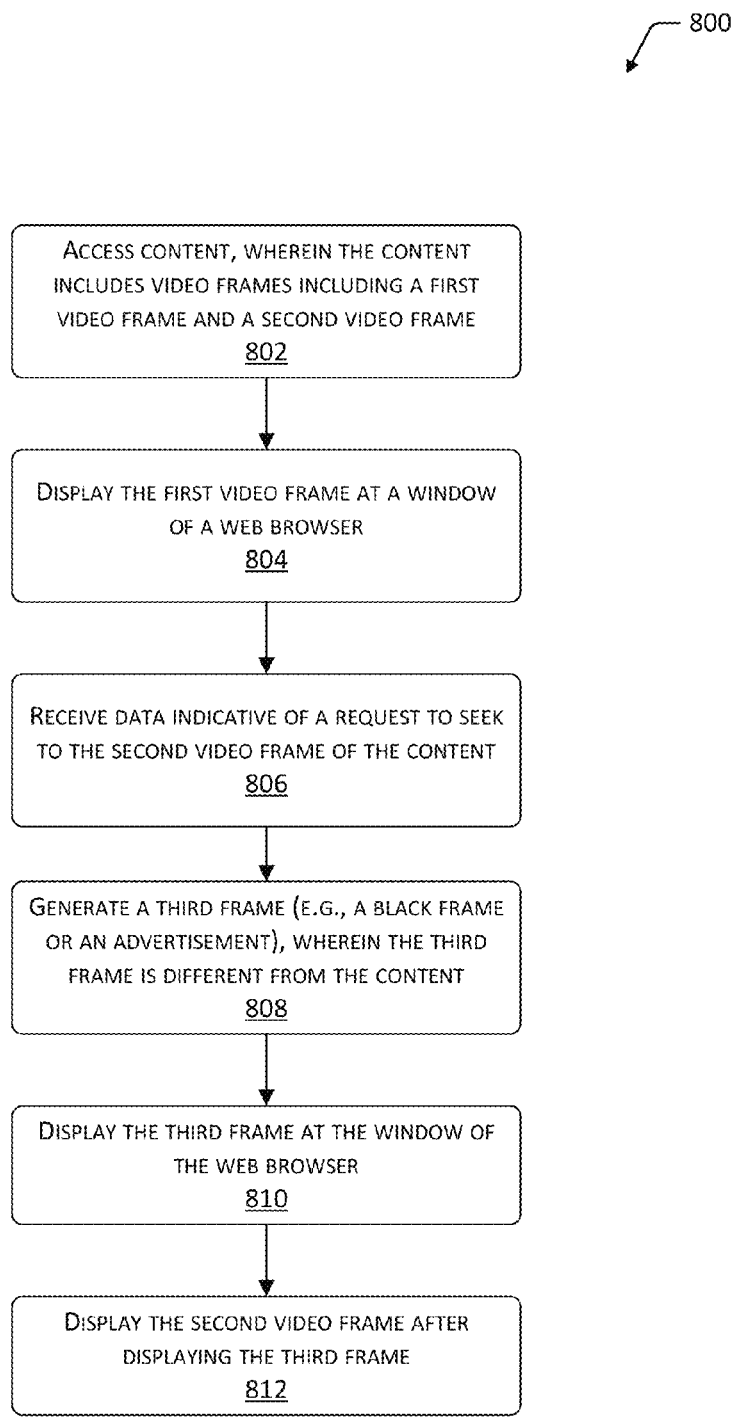
FIG. 8 is a flow diagram of a process of displaying a generated frame after receiving a request to navigate or seek to another video frame.

FIG. 8 is a flow diagram 800 of a process of displaying a generated frame after receiving a request to navigate or seek to another video frame 110. This process may be performed at least in part by the media device 104. Although the process 800 is described with reference to the flowchart illustrated in FIG. 8, many other methods performing the acts associated with the process 800 may be used. For example, the order of the steps may be changed, some of the steps described may be optional, and additional steps may be included.

At 802, the media device 104 accesses the content 106. The content 106 includes video frames 110 including a first video frame 110 and a second video frame 110. The server 108 may stream the content 106 to the media device 104 using the network described above with regard to FIG. 1. At 804, the media device 104 displays the first video frame 110 at a window of a browser. The browser may be configured to execute a markup language application. The markup language application may be expressed using HTML5 or subsequent. Compared to native applications, markup language applications are typically easier to deploy across different media devices 104, may be simpler to maintain, and so forth. The markup language application may be expressed using tags and other constructs which are compliant with at least a portion of HTML5 or subsequent as promulgated by the W3C. The HTML5 application may include scripts to provide various functionality. The scripts may be expressed using JavaScript (JS), ECMAScript as standardized by the ECMA-262 specification and ISO/IEC 16262, and so forth.

In some implementations, the media device 104 causes display of the first video frame 110 using a browser. For example, the media device 104 may comprise a set-top box configured to provide the first video frame 110 to a display device which may be operatively connected to the set-top box. The display device may be configured to display the first video frame 110.

At 806, the media device 104 receives data indicative of a request to seek to the second video frame 110 of the content 106. This data may be received in response to the user 102 selecting the fast forward button 124(1), the rewind button 124(2), or the seek button 124(3). At 808, the media device 104 generates a third frame (e.g., the black frame 138 or the advertisement frame 140). The third frame is different from the content 106.

At 810, the media device 104 displays the third frame at the window of the browser. In some implementations, the media device 104 causes display of the third frame using a browser. For example, the media device 104 may comprise a set-top box configured to provide the third frame to a display device operatively connected to the set-top box. The display device may be configured to display the third frame.

In some implementations, the third frame is associated with a z-index value used to determine a stack order associated with the browser. The media device 104 may display the third frame by configuring the z-index value such the third frame overlays the first frame. In some implementations, the transparencies of the video frames 110 and the generated third frame may be adjusted or controlled. In one example, the media device 104 adjusts the transparencies of the video frames 110 and the generated third frame such that it appears that an advertisement is displayed within the background of the display. The media device 104 may enable the user 102 to select the advertisement. In response to the selection of the advertisement, the media device 104 may present additional information regarding the product or service associated with the advertisement.

At 812, the media device 104 displays the second video frame 110 after displaying the third frame. Displaying the second video frame 110 may be followed by displaying other video frames 110 of the content 106, resulting in resuming presentation of the content 106 beginning at the requested second video frame 110. In some implementations, the media device 104 causes display of the second video frame 110 using a browser. For example, the media device 104 may comprise a set-top box configured to provide the second video frame 110 to a display device which may be operatively connected to the set-top box. The display device may be configured to display the second video frame 110.

Figure 9:
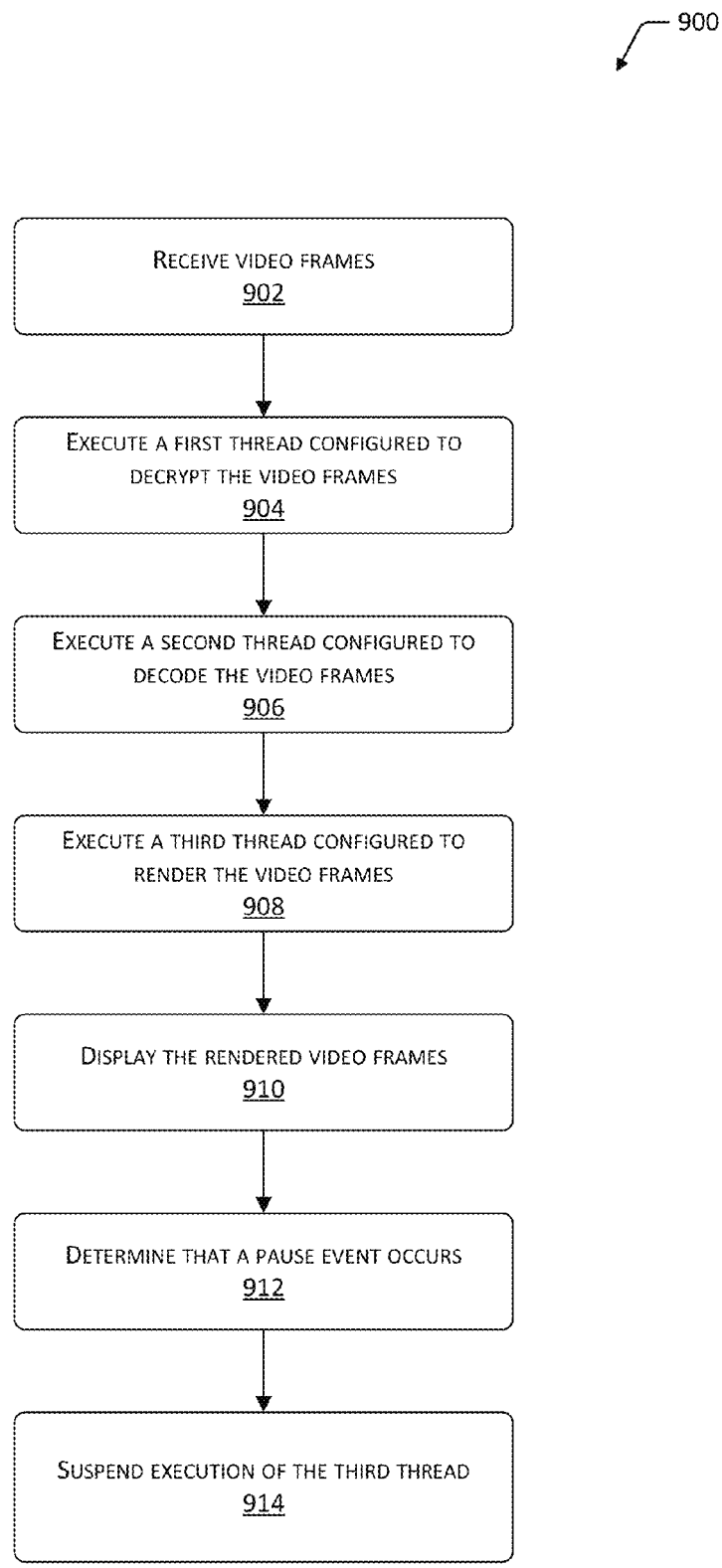
FIG. 9 is a flow diagram of a process of suspending execution of a thread configured to render video frames.

FIG. 9 is a flow diagram 900 of a process of suspending execution of a thread configured to render video frames 110. This process may be performed at least in part by the media device 104. Although the process 900 is described with reference to the flowchart illustrated in FIG. 9, many other methods performing the acts associated with the process 900 may be used. For example, the order of the steps may be changed, some of the steps described may be optional, and additional steps may be included.

At 902, the media device 104 receives the video frames 110. At 904, the media device 104 executes a first thread configured to decrypt the video frames 110. For example, the decrypt module 128 may decrypt the video frames 110.

At 906, the media device 104 executes a second thread configured to decode the video frames 110. For example, the decode module 130 may decode the video frames 110.

At 908, the media device 104 executes a third thread configured to render the video frames 110. For example, the render module 132 may render the video frames 110.

At 910, the media device 104 displays the rendered video frames 110. At 912, the media device 104 determines that the pause event 510 occurs. For example, the user 102 may have selected the pause button 124(4).

At 914, the media device 104 suspends execution of the third thread. The third thread may be implemented by the render module 132. In one example, the render module 132 is may be configured to have various states such as a play state and a pause state. When the render module 132 has the play state, the render module 132 is configured to sequentially render a plurality of video frames 110. When the render module 132 has the pause state, the render module 132 is configured to render a single video frame 110. Suspending execution of the third thread may comprise causing the render module 132 to have the pause state. The media device 104 may be configured to cause the render module 132 to change from the pause state to the play state in response to the user 102 selecting a play button.

Figure 10:
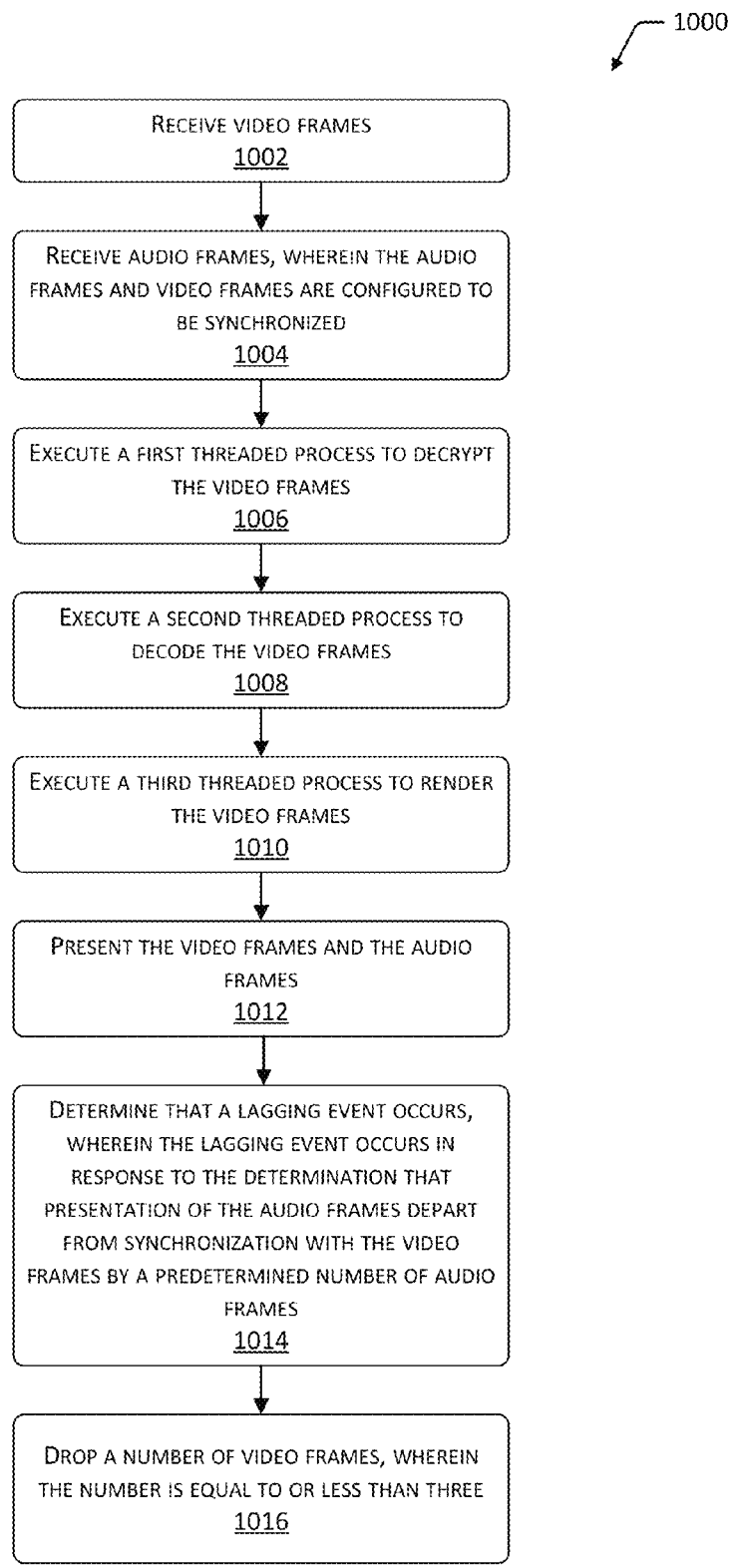
FIG. 10 is a flow diagram of a process of dropping a number of video frames based on a lagging event.

FIG. 10 is a flow diagram 1000 of a process of dropping a number of video frames 110 in response to a determination that presentation of audio frames 112 depart from synchronization with the video frames 110 by a predetermined number. This process may be performed at least in part by the media device 104. Although the process 1000 is described with reference to the flowchart illustrated in FIG. 10, many other methods performing the acts associated with the process 1000 may be used. For example, the order of the steps may be changed, some of the steps described may be optional, and additional steps may be included.

At 1002, the media device 104 receives video frames 110. At 1004, the media device 104 receives audio frames 112. The audio frames 112 and video frames 110 are configured to be synchronized.

At 1006, the media device 104 executes a first threaded process to decrypt the video frames 110. At 1008, the media device 104 executes a second threaded process to decode the video frames 110.

At 1010, the media device 104 executes a third threaded process to render the video frames 110. At 1012, the media device 104 presents the video frames 110 and the audio frames 112.

At 1014, the media device 104 determines that the lagging event 618 occurs. In this example, the lagging event 618 occurs in response to the determination that presentation of the audio frames 112 depart from synchronization with the video frames 110 by a predetermined number of audio frames 112. In one example, the predetermined number of audio frames 112 is five or less. In some implementations, the lagging event 618 occurs in response to a determination that presentation of the audio frames 112 departs from synchronization with the video frames 110 by a predetermined period of time. The predetermined period of time may be equal to or less than 150 ms. Users 102 may not be able to perceive the video frames 110 being dropped when the video frames 110 are dropped to correct the synchronization error of 150 ms because a relatively few amount of video frames 110 are being dropped.

At 1016, the media device 104 drops a number of video frames 110. In this example, the number is equal to or less than three. Dropping video frames 110 may include causing the render module 132 to skip video frames 110. In one example, the render module 132 is configured to access video frames 110 from a particular buffer queue 148. The video frames 110 stored by the buffer queue 148 may include timestamp information, and may be arranged based on the timestamp information. The render module 132 may skip rendering one or more video frames 110 based on the timestamp information. For example, the media device 104 may determine that the presented video frames 110 are not synchronized with the presented audio frames 112 because an analysis of the timestamp information of the video frames 110 and the audio frames 112 indicates that the video frames 110 are lagging behind the audio frames 112 by more than a threshold amount of time (e.g., more than 100 ms). In this example, the render module 132 may skip one or more of the video frames 110 stored within the buffer queue 148 such that the next video frame 110 to be rendered is associated with a timestamp that is equal to a timestamp of the currently presented audio frame 112.

Figure 11:
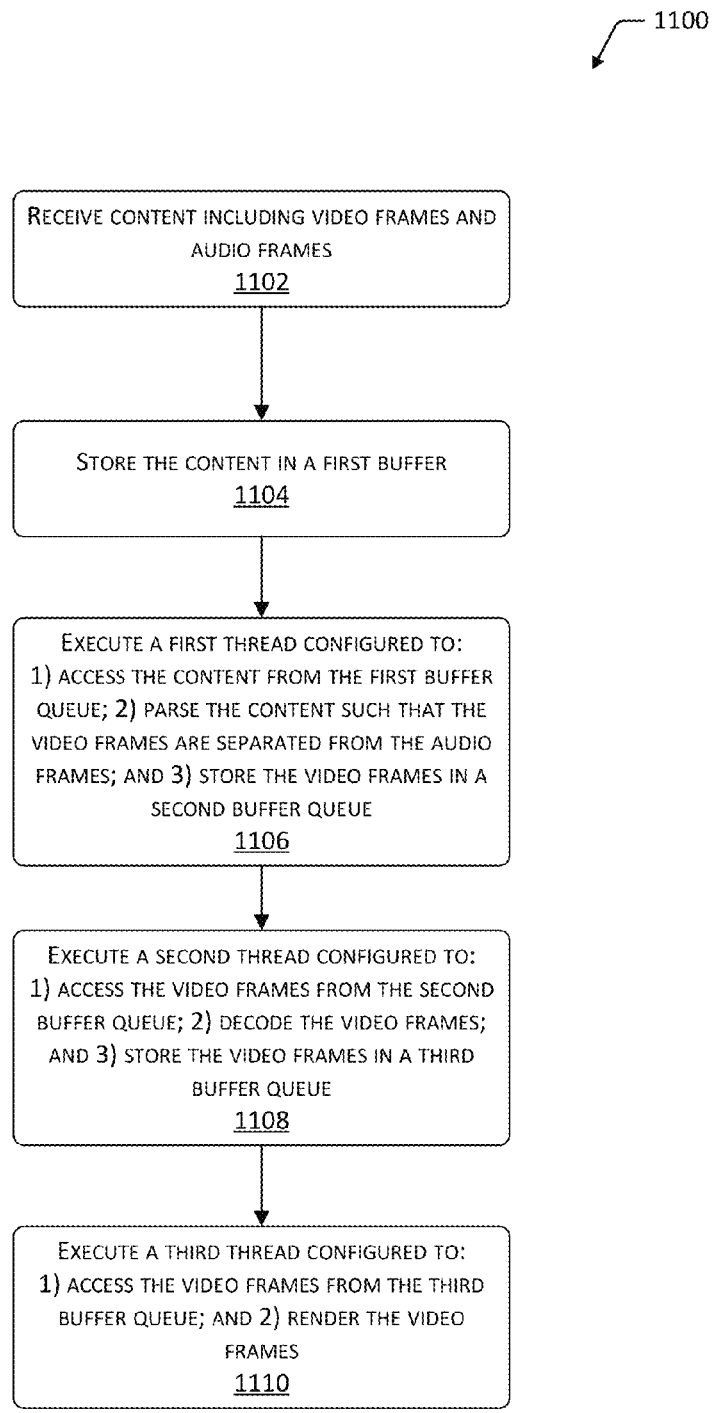
FIG. 11 is a flow diagram of a process of various threads accessing video frames from buffer queues.

FIG. 11 is a flow diagram 1100 of a process of various threads accessing video frames 110 from buffer queues 148. This process may be performed at least in part by the media device 104. Although the process 1100 is described with reference to the flowchart illustrated in FIG. 11, many other methods performing the acts associated with the process 1100 may be used. For example, the order of the steps may be changed, some of the steps described may be optional, and additional steps may be included.

At 1102, the media device 104 receives content 106 including video frames 110 and audio frames 112. At 1104, the media device 104 stores the content 106 in a first buffer queue 148(1).

At 1106, the media device 104 executes a first thread configured to: 1) access the content 106 from the first buffer queue 148(1); 2) parse the content 106 such that the video frames 110 are separated from the audio frames 112; and 3)

store the video frames 110 in a second buffer queue 148(2). At 1108, the media device 104 executes a second thread configured to: 1) access the video frames 110 from the second buffer queue 148(2); decode the video frames 110; and 2) store the video frames in a third buffer queue 148(3). At 1110, the media device 104 executes a third thread configured to: 1) access the video frames 110 from the third buffer queue 148(3); and 2) render the video frames 110.

Figure 12:
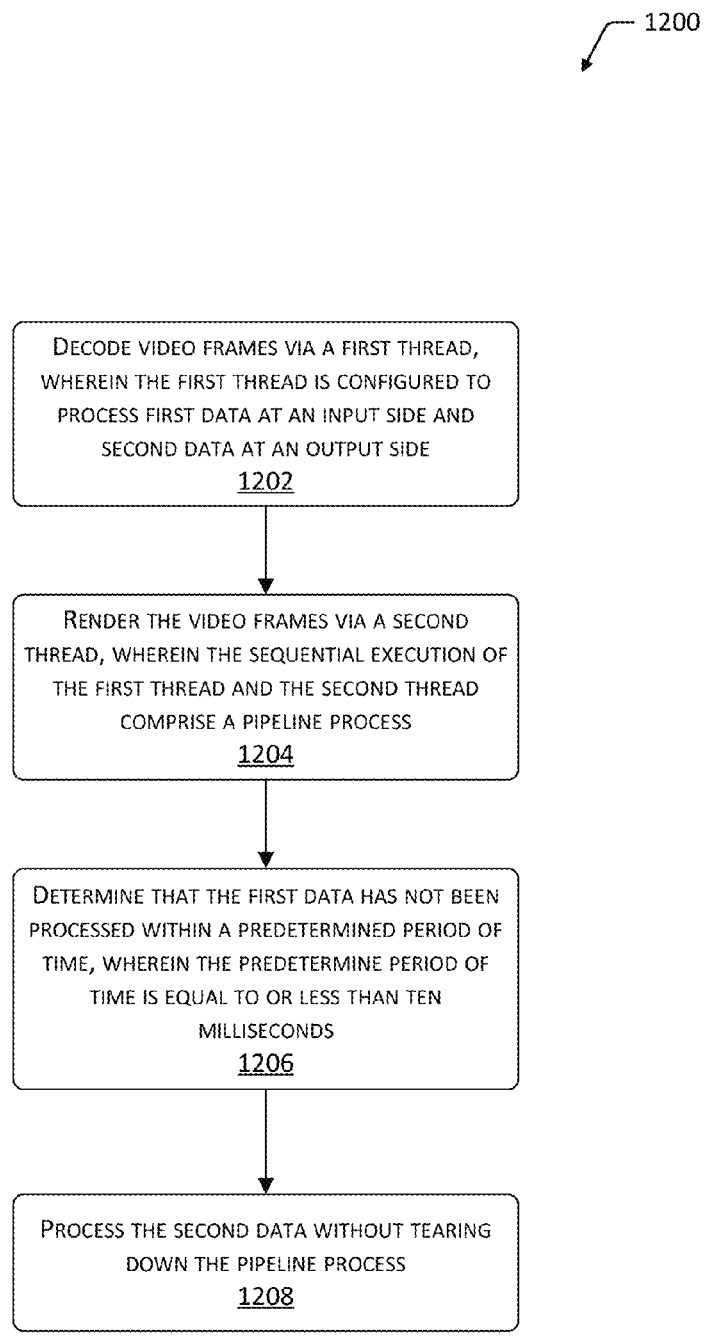
FIG. 12 is a flow diagram of a process of processing output data of a thread in response to the thread failing to process input data within a predetermined period of time, wherein the output data is processed without reinitializing a pipeline architecture.

FIG. 12 is a flow diagram 1200 of a process of processing output data of a thread in response to the thread failing to process input data within a predetermined period of time, wherein the output data is processed without reinitializing a pipeline architecture. This process may be performed at least in part by the media device 104. Although the process 1200 is described with reference to the flowchart illustrated in FIG. 12, many other methods performing the acts associated with the process 1200 may be used. For example, the order of the steps may be changed, some of the steps described may be optional, and additional steps may be included.

At 1202, the media device 104 decodes video frames 110 via a first thread. The first thread is configured to process first data at an input side and second data at an output side.

At 1204, the media device 104 renders the video frames 110 via a second thread. In this example, the sequential execution of the first thread and the second thread comprise a pipeline architecture.

At 1206, the media device 104 determines that the first data has not been processed within a predetermined period of time. In this example, the predetermine period of time is equal to or less than ten milliseconds. At 1208, the media device 104 processes the second data without reinitializing the pipeline architecture.

Figure 13:
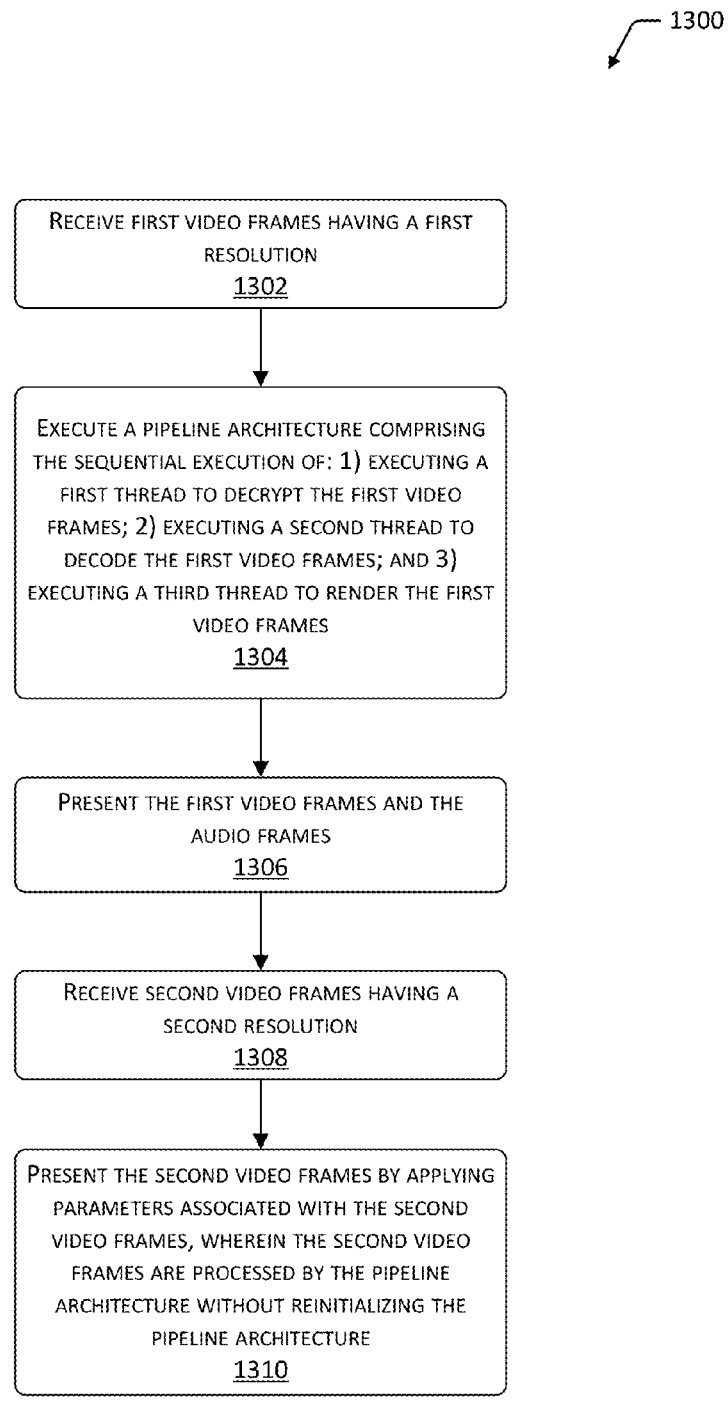
FIG. 13 is a flow diagram of a process of applying parameters to video frames having a different resolution such that the video frames are presented without reinitializing the pipeline architecture.

FIG. 13 is a flow diagram 1300 of a process of applying parameters to video frames 110 having a different resolution such that the video frames 110 are presented without reinitializing a pipeline architecture. This process may be performed at least in part by the media device 104. Although the process 1300 is described with reference to the flowchart illustrated in FIG. 13, many other methods performing the acts associated with the process 900 may be used. For example, the order of the steps may be changed, some of the steps described may be optional, and additional steps may be included.

At 1302, the media device 104 receives first video frames 110 having a first resolution. At 1304, the media device 104 executes a pipeline architecture comprising the sequential execution of: 1) executing a first thread to decrypt the first video frames 110; 2) executing a second thread to decode the first video frames 110; and 3) executing a third thread to render the first video frames 110.

At 1306, the media device 104 presents the first video frames 110 and the audio frames 112. At 1308, the media device 104 receives second video frames 110 having a second resolution.

At 1310, the media device 104 presents the second video frames 110 by applying parameters associated with the second video frames 110. The second video frames 110 are processed by the pipeline architecture without reinitializing the pipeline architecture.

The server 108 may be configured to provide the parameters to the media device 104. In some implementations, the content 106 includes the parameters as other data 114. By applying the parameters to the video frames 110, the media device 104 may perform different processes for the video frames 110. For example, the parameters may specify the use of certain motion estimation techniques, probabilistic schemes, or decoding schemes by the media device 104.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

Embodiments may be provided as a computer program product including a non-transitory computer readable storage medium having stored thereon instructions (in compressed or uncompressed form) that may be used to program a computer (or other electronic device) to perform processes or methods described herein. The computer readable storage medium can be any one of an electronic storage medium, a magnetic storage medium, an optical storage medium, a quantum storage medium and so forth. For example, the computer readable storage media may include, but is not limited to, hard drives, floppy diskettes, optical disks, read-only memories (ROMs), random access memories (RAMs), EPROMs, EEPROMs, flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A media device comprising:
at least one communication interface;
memory storing computer-executable instructions; and
at least one processor communicatively coupled to the at least one communication interface, and the memory, the at least one processor implementing a pipeline architecture and configured to:
execute an application coded in a hypertext markup language, wherein the application is configured to present content;
receive the content over one or more networks from a server, wherein the content includes video frames and audio frames;
store the content in a first buffer queue;
execute a first thread configured to:
access the content from the first buffer queue;

generate parsed video frames by parsing the content such that the video frames are separated from the audio frames; and store the parsed video frames in a second buffer queue;

execute a second thread configured to:
access the parsed video frames from the second buffer queue without waiting for the first thread to store a next parsed video frame;
generate decrypted video frames by decrypting the parsed video frames from the second buffer queue; and
store the decrypted video frames in a third buffer queue;

execute a third thread configured to:
access the decrypted video frames from the third buffer queue without waiting for the second thread to store a next decrypted video frame;
generate decoded video frames by decoding the decrypted video frames from the third buffer queue; and
store the decoded video frames in a fourth buffer queue;

execute a fourth thread configured to:
access the decoded video frames from the fourth buffer queue without waiting for the third thread to store a next decoded video frame; and
generate rendered video frames by rendering the decoded video frames from the fourth buffer queue;

display the rendered video frames, wherein the first thread, the second thread, and the third thread are supported by a media source extension module;

determine that a pause event occurs, wherein the pause event occurs in response to receiving data indicative of a request to pause the display of the rendered video frames; and suspend execution of the fourth thread without suspending execution of the first thread, the second thread and the third thread;

wherein at least one of the first thread, the second thread, the third thread, or the fourth thread are executed in a secure zone of the pipeline architecture using a restricted set of operations that are different from a non-restricted set of operations executed in a non-secure zone of the pipeline architecture.

2. The media device of claim 1, wherein the fourth thread is configured to have one of a plurality of states including a pause state and a play state, wherein suspending the execution of the fourth thread includes causing the fourth thread to change from the play state to the pause state.

3. The media device of claim 1, wherein the computer-executable instructions are further configured to:
at a first time, execute a fifth thread, via a message loop module, configured to transfer data between the first thread and the second thread,
wherein, at a second time:
the fifth thread fails to transfer data between the first thread and the second thread; and
the third thread continues to decode the video frames by accessing the video frames from the third buffer queue while the fifth thread fails to transfer data between the first thread and the second thread.

4. A method of operating a media device, the method comprising:
receiving, over one or more networks from a server, first video frames having a first resolution;

executing a pipeline architecture within a secure zone that permits operations using a restricted set of operations that are different from a non-restricted set of non-secure operations permitted within a non-secure zone, the executing the pipeline architecture comprising sequential execution of:
executing a first threaded process to generate decrypted video frames by decrypting the first video frames;
storing the decrypted video frames in a first buffer queue;
executing a second threaded process to generate decoded video frames by decoding the decrypted video frames accessed from the first buffer queue;
storing the decoded video frames in a second buffer queue;
executing a third threaded process to generate rendered video frames by rendering the decoded video frames accessed from the second buffer queue;

displaying the rendered video frames;

receiving, over the one or more networks from the server, second video frames having a second resolution;

providing the second video frames to the pipeline architecture for the sequential execution by the first threaded process, the second threaded process and the third threaded process;

rendering the second video frames having the second resolution by applying, by the third threaded process, parameters associated with the second video frames, wherein:
the parameters comprise values used to render the second video frames; and
the second video frames are processed by the pipeline architecture without reinitializing the first threaded process, the second threaded process and the third threaded process of the pipeline architecture.

5. The method of claim 4, wherein:
the first video frames and the second video frames are sent from a content server to the media device; and
the content server is configured to switch from sending the first video frames to sending the second video frames in response to bandwidth available between the content server and the media device being equal to or less than a threshold amount.

6. The method of claim 4, wherein:
the first video frames and the second video frames are sent from a content server to the media device; and
the parameters are provided by the content server.

7. The method of claim 4, further comprising:
executing one or more of the first thread, the second thread, and the third thread in the secure zone using the restricted set of operations.

8. A device comprising:
at least one communication interface;
memory storing computer-executable instructions; and
at least one processor communicatively coupled to the at least one communication interface, and the memory, the at least one processor implementing a pipeline architecture and configured to:
execute a presentation application;
receive content over one or more networks from a server, wherein the content includes video frames and audio frames;
store the content in a first buffer queue;
execute a first thread configured to:
access the content from the first buffer queue;

parse the content such that the video frames are separated from the audio frames to produce parsed video frames; and
store the parsed video frames in a second buffer queue;
execute a second thread configured to:
access the parsed video frames from the second buffer queue without waiting for the first thread to store a next parsed video frame;
decrypt the parsed video frames from the second buffer queue to produce decrypted video frames; and
store the decrypted video frames in a third buffer queue;
execute a third thread configured to:
access the decrypted video frames from the third buffer queue without waiting for the second thread to store a next decrypted video frame;
decode the decrypted video frames from the third buffer queue to produce decoded video frames; and
store the decoded video frames in a fourth buffer queue;
execute a fourth thread configured to:
access the decoded video frames from the fourth buffer queue without waiting for the third thread to store a next decoded video frame; and
render the decoded video frames from the fourth buffer queue;
determine that a transport control event occurs;
generate a frame for presentation in response to the transport control event; and
display the frame generated in response to the transport control event;
wherein at least one of the first thread, the second thread, the third thread, or the fourth thread are executed in a secure zone of the pipeline architecture using a restricted set of operations that are different from a non-restricted set of operations executed in a non-secure zone of the pipeline architecture.

9. The device of claim 8, wherein the at least one processor is further configured to:
receive, from the server, first video frames having a first resolution and second video frames having a second resolution, the second video frames having the second resolution received in response to bandwidth available between the at least one communication interface and the server being equal to or less than a threshold amount.

10. The device of claim 8, further comprising computer-executable instructions to:
display the rendered video frames, wherein the first thread, the second thread, and the third thread are supported by a media source extension module.

11. The device of claim 10, wherein the instructions to display the rendered video frames execute in the secure zone.

12. The device of claim 8, further comprising computer-executable instructions to:
determine the audio frames and the rendered video frames are not synchronized by a certain period of time; and
suspend execution of the third thread for the certain period of time.

13. The device of claim 8, further comprising computer-executable instructions to:
determine the transport control event occurs when data is received indicative of a request to pause the display of the rendered video frames; and
suspend execution of the fourth thread in response to the request to pause the display of the rendered video frames without suspending execution of the first thread, the second thread and the third thread.

14. The device of claim 8, further comprising computer-executable instructions to:
sequentially execute the first thread, the second thread and the third thread in the pipeline architecture, wherein:
for a period of time, the second buffer queue enables the second thread to continue to decode the video frames when the first thread fails to store additional video frames in the second buffer queue by accessing the video frames that are already stored in the first buffer queue.

15. The device of claim 8, further comprising computer-executable instructions to:
execute a fifth thread, via a message loop module, to transfer data between the first thread, the second thread, and the third thread, wherein the transferred data enables:
the first thread to access the content from the first buffer queue;
the second thread to access the parsed video frames from the second buffer queue; and
the third thread to access the decrypted video frames from the third buffer queue.

16. A method comprising:
receiving content over one or more networks from a server comprising video frames and audio frames;
storing the content in a first buffer queue;
executing a first thread to perform:
accessing the content from the first buffer queue;
separating the video frames from the audio frames to produce separated video frames; and
storing the separated video frames in a second buffer queue;
executing a second thread to perform:
accessing the separated video frames from the second buffer queue;
decrypting the separated video frames from the second buffer queue to produce decrypted video frames; and
storing the decrypted video frames in a third buffer queue;
executing a third thread to perform:
accessing the decrypted video frames from the third buffer queue without waiting for the second thread to store a next decrypted video frame;
decoding the decrypted video frames from the third buffer queue to produce decoded video frames; and
storing the decoded video frames in a fourth buffer queue;
executing a fourth thread to perform:
accessing the decoded video frames from the fourth buffer queue without waiting for the third thread to store a next decoded video frame; and
rendering the decoded video frames from the fourth buffer queue to produce rendered video frames; and
wherein at least one of the first thread, the second thread, the third thread, and the fourth thread are executed in a secure zone in a pipeline architecture, the secure zone permitting operations using a restricted set of operations that are different from a non-restricted set of non-secure operations permitted within a non-secure zone.

17. The method of claim 16, further comprising:
displaying the rendered video frames, wherein the first thread, the second thread, and the third thread are supported by a media source extension module.

18. The method of claim 16, further comprising:
executing, in the secure zone, instructions to display the rendered video frames.

19. The method of claim 16, further comprising:
determining the transport control event occurs when data is received indicative of a request to pause rendering of the video frames; and
suspending execution of the fourth thread in response to the request to pause the display of the rendered video frames without suspending execution of the first thread, the second thread and the third thread.

20. The method of claim 16, further comprising:
sequentially executing the first thread, the second thread and the third thread in the pipeline architecture, wherein:
for a period of time, the second buffer queue enables the second thread to continue to decode the video frames when the first thread fails to store additional content in the first buffer queue by accessing the content already stored in the first buffer queue.

* * * * *